US006465114B1

(12) United States Patent
Honda et al.

(10) Patent No.: US 6,465,114 B1
(45) Date of Patent: Oct. 15, 2002

(54) -ZN COATED STEEL MATERIAL, ZN COATED STEEL SHEET AND PAINTED STEEL SHEET EXCELLENT IN CORROSION RESISTANCE, AND METHOD OF PRODUCING THE SAME

(75) Inventors: Kazuhiko Honda, Kimitsu; Kazumi Nishimura; Yasuhide Morimoto, both of Futtsu; Satoru Tanaka; Yoshihiro Suemune, both of Kimitsu; Jun Maki, Kitakyushu; Hidetoshi Shindo, Himeji; Masaaki Sugiyama, Futtsu; Hiroyasu Furukawa, Kimitsu; Masao Kurosaki, Futtsu; Hiromasa Nomura, Futtsu; Hiroshi Kanai, Futtsu; Kohei Ueda, Futtsu, all of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/470,886

(22) Filed: Dec. 22, 1999

(30) Foreign Application Priority Data

| | | |
|---|---|---|
| May 24, 1999 | (JP) | 11-143973 |
| Jun. 22, 1999 | (JP) | 11-175853 |
| Jun. 22, 1999 | (JP) | 11-175918 |
| Jun. 25, 1999 | (JP) | 11-179913 |
| Aug. 27, 1999 | (JP) | 11-240947 |

(51) Int. Cl.[7] .......................... B32B 15/00; B32B 15/04; B05D 1/18

(52) U.S. Cl. ....................... 428/659; 148/264; 148/267; 427/433; 428/626; 428/679; 428/680; 428/334; 428/335; 428/341; 428/450; 428/926

(58) Field of Search ................................ 428/659, 626, 428/679, 680, 334, 335, 341, 450, 926, 933; 427/433; 148/264, 267

(56) References Cited

U.S. PATENT DOCUMENTS 4,401,727 A 8/1983 Berke et al. ................ 428/659
4,910,097 A * 3/1990 Nomura et al. ............. 428/659

FOREIGN PATENT DOCUMENTS

| | | | |
|---|---|---|---|
| JP | 57-1554 | 6/1957 | |
| JP | 53-44439 | 4/1978 | |
| JP | 54-159340 | 12/1979 | |
| JP | 56-96062 | 8/1981 | |
| JP | 59-23857 | 2/1984 | |
| JP | 62-27558 | 2/1987 | |
| JP | 62-027558 A * | 2/1987 | ............. C23C/2/06 |
| JP | 2-175852 | 7/1990 | |
| JP | 3-97840 | 4/1991 | |
| JP | 6-93463 | 4/1994 | |
| JP | 9-143656 | 6/1997 | |
| JP | 10-265901 | 10/1998 | |

* cited by examiner

*Primary Examiner*—Robert R. Koehler
(74) *Attorney, Agent, or Firm*—Kenyon & Kenyon

(57) ABSTRACT

A coated steel material excellent in corrosion resistance and a method of producing the same, wherein a coated steel material has on the surface of the steel sheet a Zn-alloy coating layer containing 1–10 wt % of Mg, 2–19 wt % of Al and 0.01–2 wt % of Si, where Mg and Al satisfy Mg (%)+Al (%)≦20%, the balance being Zn and unavoidable impurities, and has a coating layer structure of a Mg intermetallic compound or the like. As a base metal treatment, it is preferably provided with a Ni coating layer. The coated Zn-alloy coated steel sheet may have provided on the coating layer, as an intermediate layer, a chromate film layer, and, as an upper layer, an organic coating layer. The Zn-alloy coating layer may further contain one or more of 0.01–1 wt % of In, 0.01–1 wt % of Bi and 1–10 wt % of Sn. The coated steel material may be painted.

22 Claims, 1 Drawing Sheet

-ZN COATED STEEL MATERIAL, ZN COATED STEEL SHEET AND PAINTED STEEL SHEET EXCELLENT IN CORROSION RESISTANCE, AND METHOD OF PRODUCING THE SAME

TECHNICAL FIELD

The present invention relates to a Zn coated steel material, a Zn coated steel sheet and a painted steel sheet, more particularly to a Zn coated steel material, a Zn coated steel sheet and a painted steel sheet that are excellent in corrosion resistance and can be applied to various purposes, such as for home electrical appliances and building materials. The present invention further relates to a Zn coated steel sheet for construction materials and home electrical appliances that is excellent in corrosion resistance of machined portions and is planet-friendly since it does not contain chromium which is believed to put a heavy load on the environment.

BACKGROUND TECHNOLOGY

Zinc-system coated steel sheet is among those most often used as a Zn coated steel material excellent in corrosion resistance. Zinc-system coated steel sheet is used in various manufacturing industries, including the automotive, home electrical appliance and building material sectors. In the building material sector particularly, Zn coated steel sheet is used without further processing for prepreg components and the like and after coating for roofing, wall materials and the like.

The need for improvement of the corrosion resistance of galvanized steel sheet used in these building material sectors is further intensifying and conventional Zn coated steel sheet is incapable of fully meeting the needs of consumers.

Galvano-aluminum steel sheet, which usually called “Galvalume”®, (55%Al—1.6%Si—Zn-alloy coated steel sheet) is therefore used as high-corrosion-resistance coated steel sheet for building materials. As peripheral patents of U.S. Pat. No. 3,026,606, that relates to this “Galvalume®” steel sheet, Japanese Patent Publication No. Hei 3-21627 proposes a Zn coated steel sheet having 3–20% Mg, 3–15% of Si, Al/Zn=1–1.5, and as intermetallic compound $Mg_2Si$, $MgZn_2$, $SiO_2$, $Mg_{32}$ (Al, Zn)$_{49}$, and discloses that the corrosion resistance is good. However, owing to the fact that, similarly to “Galvalume”® steel sheet, the Al content of the bulk coating layer is high relative to Zn, the sacrificial corrosion prevention capability is low and the corrosivity of portions where the underlying metal is exposed, such as the end faces of coated materials, remains a problem.

On the other hand, in comparison with the method of applying a paint after first forming the steel sheet into a complex shape, painted steel sheet (precoated steel sheet) is advantageous in such points as that the painting process can be streamlined, the quality is uniform and painting material consumption is reduced, and, therefore, much has been used up to now and the amount used is expected to increase in the future. Painted steel sheet is generally formed into the desired shape after the cold-rolled steel sheet or zinc-coated steel sheet has been coated, and is then submitted to the final use. It is used in, for example, home electrical appliances (refrigerators, washing machines, microwave ovens etc.), automatic vending machines, office equipment, automobiles, the outdoor units of airconditioners, and the like.

In these various applications, the painted steel sheet is required to have an attractive appearance while also possessing machinability and corrosion resistance. In the case of products for home electrical appliances and building materials used outdoors, occurrence of corrosion at machined portions and scratched portions tends to be particularly objectionable as degrading product value, because the painted steel sheet is used after machining.

Various ways for improving the corrosion resistance of painted steel sheet have therefore been proposed. Japanese Unexamined Patent Publication No. Sho 61-152444, for instance, teaches improving fabricated-portion corrosion resistance by forming a chromate layer and a zinc-rich painting material on a Zn—Ni coated steel sheet.

However, the foregoing and other coated steel materials, coated steel sheets and painted steel sheets disclosed up to now cannot be said to achieve sufficient corrosion resistance.

Japanese Unexamined Patent Publication No. Hei 8-168723 teaches a technology for obtaining a painted steel sheet, excellent in machinability, anticontamination property and hardness, by defining a film structure, and Japanese Unexamined Patent Publication No. Hei 3-100180 discloses a painted steel sheet improved in end face corrosion resistance by using a specific chromate treatment solution.

Such film structures are formed by subjecting a coated steel sheet of excellent corrosion resistance to a base metal treatment, called chromate treatment, that provides excellent corrosion resistance and adherence, providing an undercoating containing a chromium-system anti-rust pigment that is excellent in corrosion resistance thereon, and providing a colored overcoating on the undercoating.

The hexavalent chromium contained in the chromate-treated portion and the chromium-system anti-rust pigment is water soluble and acts to suppress corrosion of the zinc-coated steel sheet by dissolving out. If the coating should crack under harsh machining, for example, the chromium suppresses corrosion at this portion. Owing to such outstanding features, chromate treatments and chromium-system anti-rust pigments have been widely used on painted steel sheet.

However, hexavalent chromium, which may dissolve out of the chromate-treated portion and the chromium-system anti-rust pigment, is a substance that puts a heavy load on the environment. Calls for chromium-free base metal treatments and chromium-free anti-rust pigments have recently intensified.

Highly corrosion-resistant coated steel materials (steel sheet, steel wire etc.) are very likely to be used in large amounts with a view to extending service life in building material applications as well as civil engineering applications such as guardrails, sound-insulting walls, basket mats and the like. Particularly in applications such as guardrail posts and the like, whose fabrication involves roll forming, grinding with a cutting tool etc., the ordinary hot-dip galvanized steel sheet is easily scratched by the rolls and the chip from the cutting tool. On the other hand, the coating layer of Zn coated wire for basket mats is likely to develop scratches or cracks during coiling or net fabrication. As these often become a cause for degradation of corrosion resistance and the like, product improvement has been desired.

PCT/J97/04594 teaches a hot-dip Zn—Al—Mg alloy galvanized steel sheet, and a method of producing the same, that is a hot-dip Zn—Al—Mg alloy galvanized steel sheet good in corrosion resistance and surface appearance obtained by forming, on a surface of a steel sheet, a hot-dip Zn—Al—Mg alloy galvanized layer composed of 4.0–10 wt % of Al, 1.0–4.0 wt % of Mg, Ti and B as required, and the balance of Zn and unavoidable impurities, the coating layer having a metallic structure including a primary crystal Al phase interspersed in a matrix of $Al/Zn/MgZn_2$ ternary eutectic structure. Although this invention aims at the ternary eutectic point in the ternary state diagram and provides a steel sheet excellent in corrosion resistance, it still has room for improvement regarding the corrosion resistance of the end faces and fabricated portions.

Earlier, in Japanese Unexamined Patent Publication No. Hei 4-147955, the present inventors proposed a method of producing a Zn—Mg—Al alloy galvanized steel sheet whose resistance to red rust after fabrication is markedly superior to an ordinary hot-dip galvanized steel sheet. In the present invention, the inventors have developed a Zn coated steel material, a Zn coated steel sheet and a painted steel sheet that have improved corrosion resistance of end faces and fabricated portions, and a method of producing the same. Specifically, in a Zn—Al—Mg—Si quaternary system, the present invention achieves high sacrificial corrosion prevention performance and enhances end-face corrosion resistance by defining a Zn-based coating layer containing 2–19% of Al, 1–10% of Mg, and 0.01–2% of Si. Sacrificial corrosion prevention performance and stabilization of corrosion products are achieved by structurally controlling the coating layer bulk portion and dispersing Mg compounds, thereby markedly improving heretofore unattainable end-face and fabricated-portion corrosion resistance.

The inventors further achieved the present invention based on the discovery that still better corrosion resistance, after coating, can be obtained by forming a Zn—Mg—Al—Si-alloy coating on the surface of a steel material and thereafter further carrying out chromate treatment and coating. They further achieved the present invention based on the discovery that excellent corrosion resistance can be obtained, in the course of forming the Zn—Mg—Al—Si-alloy coating on the steel material surface, by forming a metallic structure including a "primary crystal $Mg_2Si$ phase" interspersed in the solidified structure of the coating layer.

Further, regarding the fabricated-portion corrosion resistance of different painted steel sheets after coating, the inventors conducted various studies under various chromium-free base metal treatment conditions and various chromium-free primer conditions. As a result, the inventors discovered that a chromium-free coated steel sheet that puts little load on the environment and has excellent coating adherence and fabricated-portion corrosion resistance can be produced by subjecting a steel sheet surface to Zn—Mg—Al—Si-alloy coating, effecting tannin or tannin acid-system treatment instead of chromate treatment as a base metal treatment, or effecting silane coupling-system treatment instead of chromate treatment as a base metal treatment, and imparting an organic film thereon. The present invention was accomplished based on this discovery.

The inventors prepared various plating samples under differing coating bath compositions, cooling and other conditions and made a detailed investigation of the relationship between the coating layer structure and sliding property during fabrication, i.e., coating layer scratch resistance in coated steel sheet sliding tests and plated wire coiling tests, and between coating layer structure and fabricated-portion corrosion resistance. As a result, the inventors accomplished the present invention by specifying the composition and the structure the coating layer should have.

DISCLOSURE OF THE INVENTION

One object of the present invention is to overcome the foregoing problems by providing a Zn coated steel material, a zn coated steel sheet and a painted steel sheet that are excellent in corrosion resistance.

Another object of the present invention is to provide a Zn coated steel sheet that is excellent in fabricated-portion corrosion resistance and, being chromium free, puts little load on the environment.

Another object of the present invention is to provide a Zn coated steel material excellent in machinability, namely, a Zn coated steel material excellent in scratch resistance when subjected to sliding or coiling, adherence and fabricated-portion corrosion resistance.

The gist of the present invention is as follows:

(1) A Zn coated steel material excellent in corrosion resistance characterized in having on a surface of a steel material a Zn-alloy coating layer containing 2–19 wt % of Al, 1–10 wt % of Mg, 0.01–2 wt % of Si and the balance of Zn and unavoidable impurities.

(2) A Zn coated steel material excellent in corrosion resistance according to (1), characterized in that Mg and Al in the Zn-alloy coating layer satisfy the following formula: $Mg(\%)+Al(\%)\leqq 20\%$.

(3) A Zn coated steel material excellent in corrosion resistance according to (1) or (2), characterized in that one or more of 0.01–1 wt % of In, 0.01–1 wt % of Bi and 1–10 wt % of Sn are further contained as Zn-alloy coating components.

(4) A Zn coated steel material excellent in corrosion resistance according to (1) or (2), characterized in that one or more of 0.01–0.5% of Ca, 0.01–0.2% of Be, 0.01–0.2% of Ti, 0.1–1.0% of Cu, 0.01–1.0% of Ni, 0.01–0.3% of Co, 0.01–0.2% of Cr, 0.01–0.5% of Mn, 0.01–3.0% of Fe and 0.01–0.5% of Sr are further contained as Zn-alloy coating components, that total amount of elements other than these elements is held to not greater than 0.5 wt % and that among them Pb is limited to not greater than 0.1 wt % and Sb to not greater than 0.1 wt %.

(5) A Zn coated steel material excellent in corrosion resistance according to (1) or (2), characterized in that the coating layer has a metallic structure of primary crystal $Mg_2Si$ phase, $MgZn_2$ phase and Zn phase interspersed in a matrix of an $Al/Zn/MgZn_2$ ternary eutectic structure.

(6) A Zn coated steel material excellent in corrosion resistance according to (1) or (2), characterized in that the coating layer has a metallic structure of primary crystal $Mg_2Si$ phase, $MgZn_2$ phase and Al phase interspersed in a matrix of an $Al/Zn/MgZn_2$ ternary eutectic structure.

(7) A Zn coated steel material excellent in corrosion resistance according to (1) or (2), characterized in that the coating layer has a metallic structure of primary crystal $Mg_2Si$ phase, $MgZn_2$ phase and, Zn phase and Al phase interspersed in a matrix of an $Al/Zn/MgZn_2$ ternary eutectic structure.

(8) A Zn coated steel material excellent in corrosion resistance according to (1) or (2), characterized in that the coating layer has a metallic structure of primary crystal $Mg_2Si$ phase, Zn phase and Al phase interspersed in a matrix of an $Al/Zn/MgZn_2$ ternary eutectic structure.

(9) A Zn coated steel material excellent in corrosion resistance according to any of (1) to (8), characterized in that a Ni coating layer is formed as an underlying layer for the Zn-alloy coating layer.

(10) A Zn coated steel material excellent in corrosion resistance and machinability according to any of (1) to (4), characterized in that a Mg-system intermetallic compound phase of a major diameter of not less than 1 μm is dispersed in the Zn-alloy coating layer at a content of 0.1–50 vol%.

(11) A Zn coated steel material excellent in corrosion resistance and machinability according to (10), characterized in that the intermetallic compound phase containing Mg is one or more of Mg—Si-system, Mg—Zn-system, Mg—Sn-system, Mg—Fe-system, Mg—Ni-system, Mg—Al-system and Mg—Ti-system.

(12) A Zn coated steel material excellent in corrosion resistance and machinability according to (10) or (11), characterized in that a Ni coating layer is formed at 0.2–2 $g/m^2$ as a base metal treatment for the Zn-alloy coating layer.

(13) In the method of producing a Zn-alloy coated steel material having on a surface of a steel material a Zn-alloy coating containing 3–10 wt % of Mg, 4–19 wt % of Al, 0.01–2 wt % of Si and the balance of Zn and unavoidable impurities, a method of producing a Zn coated steel material excellent in corrosion resistance characterized in that plating bath temperature is set at not less than 450° C. and not greater than 650° C. and a cooling rate after coating is controlled to not less than 0.5° C./second.

(14) A Zn coated steel sheet excellent in corrosion resistance according to any of (1)–(12), characterized in that it has, as an upper layer on the Zn-alloy coating layer, a resin chromate film of 10–300 $mg/m^2$ as metallic chromium formed by applying and drying a resin chromate bath that utilizes a water-soluble chromium compound of a chromium reducibility $\{CR^{3+}/(CR^{3+}+Cr^{6+}\}\times100(\text{wt }\%)\}$ of not greater than 70 (wt %), is adjusted to a copresence of phosphoric acid and the water-soluble chromium compound such that a $H_3PO_4/CrO_3$ ratio (as chromic acid) is not less than 1 and a $H_3PO_4/Cr^{6+}$ ratio (as chromic acid) is not greater than 5, and is blended with an organic resin to make an organic resin/$CrO_3$ ratio (as chromic acid) not less than 1.

(15) A painted steel sheet excellent in corrosion resistance according to any of (1)–(12), characterized in that it has as an intermediate layer on the Zn-alloy coating layer, a chromate film layer and, further, as an upper layer an organic film layer of 1–100 μm thickness.

(16) A painted steel sheet excellent in corrosion resistance according to (15), characterized in that the organic film is a thermosetting resin coating film.

(17) A painted steel sheet that is excellent in fabricated-portion corrosion resistance and puts little load on the environment according to any of (1)–(12), characterized in that it has, on the Zn-alloy coating layer, an intermediate layer containing 100 parts by weight of resin as solids content and 0.2–50 parts by weight of tannin or tannic acid, and has an organic film layer as an upper layer.

(18) A painted steel sheet that is excellent in fabricated-portion corrosion resistance and puts little load on the environment according to any of (1)–(12), characterized in that it has on the Zn-alloy coating layer an intermediate layer containing 100 parts by weight of resin as solid content and 0.1–3000 parts by weight of a silane coupling agent, and has an organic film layer as an upper layer.

(19) A painted steel sheet that is excellent in fabricated-portion corrosion resistance and puts little load on the environment according to (17) or (18), characterized in that the organic film layer has a thickness of 1–100 μm.

(20) A painted steel sheet that is excellent in fabricated-portion corrosion resistance and puts little load on the environment according to (17), characterized in that the intermediate layer further contains 10–500 parts by weight of fine-grain silica as solid content.

(21) A painted steel sheet that is excellent in fabricated-portion corrosion resistance and puts little load on the environment according to (18), characterized in that the intermediate layer further contains at least one of 1–2000 parts by weight of fine-grain silica and 0.1–1000 parts by weight of an etching fluoride as solid content.

(22) A painted steel sheet that is excellent in fabricated-portion corrosion resistance and puts little load on the environment according to any of (17)–(21), wherein the organic film layer is composed of an undercoating containing an anti-rust pigment and a colored overcoating.

BEST MODES FOR CARRYING OUT THE INVENTION

Figure 1:
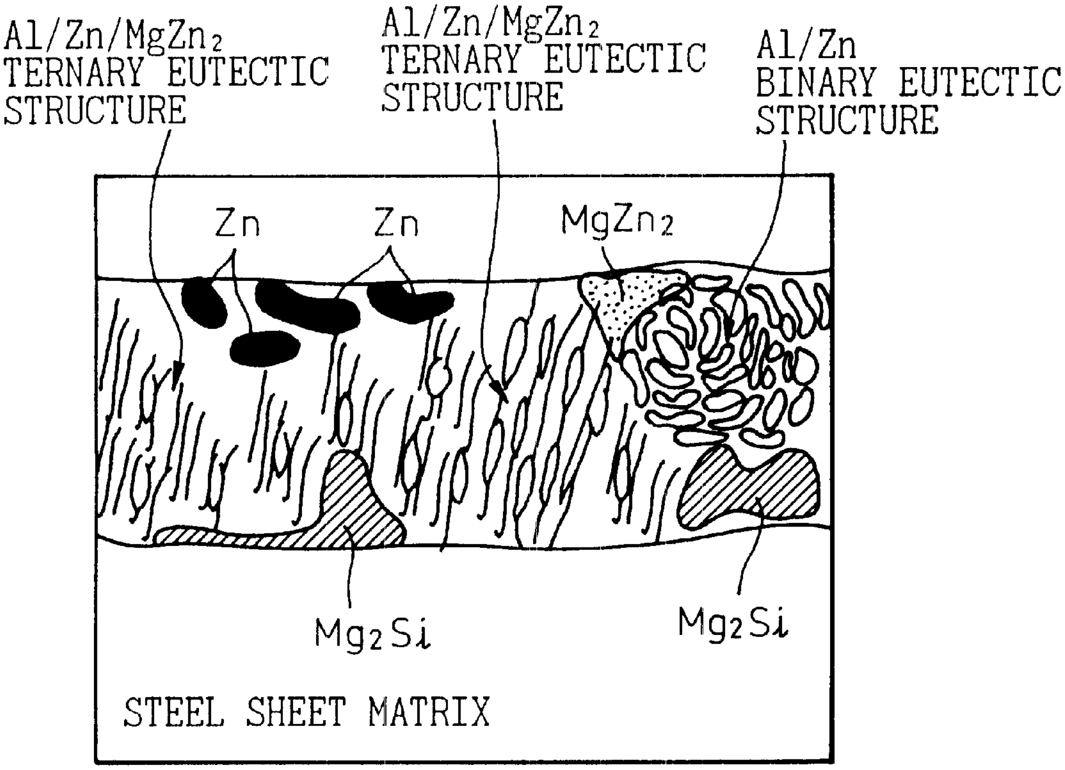
FIG. 1 is a diagrammatized electron microscope image of the coating structure according to the present invention, showing that the coating structure is a mixed structure of an $Al/Zn/MgZn_2$ ternary eutectic structure, Al phase (Al/Zn binary structure), and $Mg_2Si$, $MgZn_2$ and Zn phases.

The present invention will be explained in detail in the following.

As termed with respect to the present invention, a "coated steel material" is that obtained by imparting a Zn—Mg—Al—Si alloy coating layer to a steel material surface. A "coated steel sheet" is that obtained by imparting a Zn—Mg—Al—Si alloy coating layer to a steel sheet and that obtained by successively imparting layers composed of a Zn—Mg—Al—Si alloy coating and a chromate film to a steel sheet. A "painted steel sheet" is that obtained by successively imparting layers composed of a Zn—Mg—Al—Si alloy coating, a chromate film and an organic film to a steel sheet and that obtained by successively imparting a Zn—Mg—Al—Si-alloy coating, a tannin or tannic acid-system treatment or a silane coupling treatment to a steel sheet, and an organic film layer thereon. As the underlying steel sheet of the present invention, there can be utilized any of various types including those of Al-killed steel, very low carbon steel with added Ti, Nb or the like, and high-strength steel obtained by adding to the above strengthening elements such as P, Si and Mn.

The Zn—Mg—Al—Si alloy coating layer defined by the present invention is a Zn-alloy coating layer composed of 1–10 wt % of Mg, 2–19 wt % of Al, 0.01–2 wt % of Si and the balance of Zn and unavoidable impurities.

Moreover, the Zn—Mg—Al—Si alloy coating layer of the present invention is a Zn-alloy coating layer containing 1–10 wt % of Mg, 2–19 wt % of Al and 0.01–2 wt % of Si, where Mg and Al satisfy the formula $Mg(\%)+Al(\%)\leqq 20\%$, the balance being Zn and unavoidable impurities.

In addition, the Zn—Mg—Al—Si alloy coating layer of the present invention is a Zn-alloy coating layer containing 1–10 wt % of Mg, 2–19 wt % of Al and 0.01–2 wt % of Si and further containing one or more of 0.01–1 wt % of In, 0.01–1 wt % of Bi and 1–10 wt % of Sn, the balance being Zn and unavoidable impurities.

The reason for limiting Mg content to 1–10 wt % is that at less than 1 wt % the effect of improving corrosion resistance is insufficient and that at greater than 10 wt % the coating layer becomes brittle and its adherence decreases. The reason for limiting Al content to 2–19 wt % is that at less than 2 wt % the coating layer becomes brittle and its adherence decreases and at greater than 19 wt % no further effect of improving corrosion resistance is observed.

The reason for limiting Si content to 0.01–2 wt % is that at less than 0.01 wt % Si in the coating layer and Fe in the steel sheet react to make the coating layer brittle and decrease its adherence and at greater than 2 wt % no further effect of improving adherence is longer observed.

The reason for limiting the Mg and Al content to one satisfying the formula Mg(%)+Al(%)≦20% is that the sacrificial corrosion prevention effect diminishes and the corrosion resistance decreases when the Zn content of the plating is low.

One or more of the elements In, Bi and Sn are added to improve corrosion resistance.

The main reasons for the improvement of corrosion resistance by addition of these elements is considered to be the following two points:

(1) Addition of these elements stabilizes the coating corrosion products and reduces the corrosion rate of the coating layer.

(2) The thin film formed on the surface of the coating layer exhibits a passivation tendency, reaction at the interface between the coating layer the coating is suppressed, and a contribution is made to coating stability.

The effect of improving corrosion resistance starts to become pronounced at 0.01, 0.01 and 1 wt % of In, Bi and Sn, respectively, and the effect saturates in excess of certain addition amounts. When the addition amount becomes large, the appearance after coating becomes coarse, owing to, for example, occurrence of appearance defects caused by the adherence of dross, oxides and the like. The upper limits of the elements are therefore 1, 1 and 10 wt % for In, Bi and Sn, respectively.

Further, the Zn-alloy coating layer of the present invention is a Zn-alloy coating layer containing, in wt %, 1–10% of Mg, 2–19% of Al and 0.01–2% of Si, further containing one or more of 0.01–0.5% of Ca, 0.01–0.2% of Be, 0.01–0.2% of Ti, 0.1–1.0% of Cu, 0.01–1.0% of Ni, 0.01–0.3% of Co, 0.01–0.2% of Cr, 0.01–0.5% of Mn, 0.01–3.0% of Fe and 0.01–0.5% of Sr, the total amount of elements other than these elements being held to not greater than 0.5 wt % and among them Pb being limited to not greater than 0.1 wt % and Sb to not greater than 0.1 wt %, and the balance of Zn and unavoidable impurities.

The reason for adding one or more of Ca, Be, Ti, Cu, Ni, Co, Cr, Mn, Fe and Sr, is to improve corrosion resistance after coating and the reasons that the corrosion resistance after coating improves are as follows.

(1) The thin film formed on the coating layer surface additionally exhibits passivation tendency and corrosion of the coating layer, under the coating, slows.

(2) The passivation tendency suppresses reaction at the interface between the coating layer and the coating and contributes to coating stabilization.

(3) Fine roughness exhibited by the coating layer surface is thought to produce an anchoring effect with respect to the coating.

The effect of improving corrosion resistance after painting is observed at not less than 0.01, 0.01, 0.01, 0.1, 0.01, 0.01, 0.01, 0.01, 0.01 and 0.01 wt % of Ca, Be, Ti, Cu, Ni, Co, Cr, Mn, Fe and Sr, respectively. On the other hand, when the addition amount becomes large, the appearance after painting becomes coarse, owing to, for example, occurrence of appearance defects caused by the adherence of dross, oxides and the like. The upper limits of the element addition amounts are therefore 0.5, 0.2, 0.2, 1.0, 1.0, 0.3, 0.2, 0.5, 3.0 and 0.5 wt % of Ca, Be, Ti, Cu, Ni, Co, Cr, Mn, Fe and Sr, respectively.

The total amount of elements that are unavoidable impurities, such as Fe, Pb, Sn and Sb, is held to not more than 0.5 wt % and among them Pb is limited to not more than 0.1 wt % and Sb to 0.1 wt %.

The reason for limiting the total amount of impurities to not greater than 0.5 wt % is that when the total amount is greater than 0.5 wt %, use as a painted steel sheet becomes impossible owing to inferior adherence. Specifically, when a painted steel sheet with poor coating adherence is used in a painted steel sheet to be machined and used after painting, the paint peels off together with the coating layer after fabrication, making its use as a product impossible. Pb and Sb in particular must be limited to not greater than 0.1 wt % and not greater than 0.1 wt % in order to ensure coating adherence.

Although no particular restriction is established regarding the coating weight of the Zn—Mg—Al—Si alloy coating, it is preferably not less than 10 g/$m^2$ from the viewpoint of corrosion resistance and not greater than 350 g/$m^2$ from the viewpoint of machinability.

In the present invention, in order to obtain a coated steel sheet with still better corrosion resistance, the amounts of Al, Mg and Si are preferably made large to obtain a metallic structure having "primary crystal $Mg_2Si$ phase" mixed in the solidified structure of the coating layer. A Mg content of not less than 2 wt % and an Al content of not less than 4 w % is preferable for this. More preferably the Mg content is 3–10 w % and the Al content is 4–9 wt %.

This coating composition is a Zn—Mg—Al—Si quaternary alloy. When the amounts of Al and Mg are relatively small, however, it behaves like a Zn—Si binary alloy and may experience crystallization of Si-system precipitates at the start of solidification. After this, it exhibits solidification behavior similar to that of the remaining Zn—Mg—Al ternary alloy. Specifically, after crystallization of [Si phase], there occurs a metallic structure including one or more of [Zn phase], [Al phase] and [$MgZn_2$ phase] in a matrix of a [Al/Zn/$MgZn_2$ ternary eutectic structure]. Its state is shown in FIG. 1. FIG. 1 is a diagrammatized electron microscope image of the coating structure according to the present invention, showing that the coating structure is a mixed structure of an Al/Zn/$MgZn_2$ ternary eutectic structure, Al phase (Al/Zn binary structure), and $Mg_2Si$, $MgZn_2$ and Zn phases. (In all cases, the coating sectional structure was thin-sliced using the focused ion beam (FIB) machining method. A 200kV electron microscope, Hitachi, Ltd. model HF-2000, was used for observation. An EDX detector, product of Kevex Instruments, Inc., was used for analysis.)

When the amount of Al and Mg is increased to a certain degree, the behavior exhibited at the start of solidification resembles that of an Al—Mg—Si ternary alloy and $Mg_2Si$ crystallizes. After this, solidification behavior similar to that of the remaining Zn—Mg—Al ternary alloy is exhibited. Specifically, after crystallization of [$Mg_2Si$ phase] as primary crystal, there occurs a metallic structure including one or more of [Zn phase], [Al phase] and [$MgZn_2$ phase] in a matrix of an [Al/Zn/$MgZn_2$ ternary eutectic structure].

[$Mg_2Si$ phase] is a phase observed in the solidified structure of the coating layer in the shape of islands with well-defined boundaries and is a phase corresponding to, for example, primary crystal $Mg_2Si$ in the Al—Mg—Si ternary equilibrium phase diagram. So far as can be observed in the state diagram, Zn and Al are not in solid solution. Even if any is, the amounts can be considered to be very small. This [$Mg_2Si$ phase] can be clearly discerned in the plating by microscopic observation.

[Al/Zn/$MgZn_2$ ternary eutectic structure] is a ternary eutectic structure of Al phase, Zn phase and intermetallic compound $MgZn_2$. While the ternary eutectic structure can be clearly discerned by microscopic observation, investigation of the individual distribution states is clarified by observation with a transmission electron microscope. Although the Al phase of the ternary eutectic structure sometimes contains a small amount of Zn or Mg, much of the Zn phase is lumpy and can be distinguished from the Al phase. The Zn phase may likewise contain a small amount of solid-solution Al and, in some cases, may be a Zn solid solution further containing a small amount of Mg in solid solution. The $MgZn_2$ phase in the ternary eutectic structure is an intermetallic compound of the reported hexagonal crystal (a=0.522 nm, σ=0.857 nm) structure. So far as can be observed in the state diagram, Si is not in solid solution in any of the phases. Even if any is, the amount can be considered to be very small. As the amount thereof cannot be clearly discerned by ordinary analysis, however, the ternary eutectic structure composed of the three phases is defined as an [Al/Zn/$MgZn_2$ ternary eutectic structure] in the present invention.

[Al phase] is a phase observed in the ternary eutectic structure matrix in the shape of islands with well-defined boundaries and is thought to be a phase corresponding to, for example, [Al" phase] at a high temperature (which is an Al solid solution with Zn phase in solid solution that contains a small amount of Mg) in the Al—Mg—Mg ternary equilibrium phase diagram. At room temperature, it is observed as a laminar structure composed of Al and Zn. Although it has island-like boundaries when the amount of Al is small, it tends to increase with increasing Al and addition of Si, and this Al/Zn binary structure may develop beyond the island-like state.

[Zn phase] is a phase observed in the ternary eutectic structure and the binary eutectic structure matrices in the shape of islands with well-defined boundaries and may actually contain a small amount of Al and a small amount of Mg in solid solution. So far as can be observed in the state diagram, Si is not contained in solid solution in this phase. Even if any is, the amount can be considered to be very small. This [Zn phase] can be clearly distinguished from Zn phase forming the ternary eutectic structure and the binary eutectic structure by microscopic observation.

[$MgZn_2$ phase] is a phase observed in the ternary eutectic structure matrix in the shape of islands with well-defined boundaries and may actually contain a small amount of Al in solid solution. So far as can be observed in the state diagram, Si is not contained in solid solution in this phase. Even if any is, the amount can be considered to be very small. This [$MgZn_2$ phase] can be clearly distinguished from the $MgZn_2$ phase forming the ternary eutectic structure by microscopic observation.

In the present invention, the crystallization of the [Si phase] does not particularly affect corrosion resistance improvement but the crystallization of the [primary crystal $Mg_2Si$ phase] clearly contributes to corrosion resistance enhancement. This is thought to derive from the fact that $Mg_2Si$ is highly active, namely, that it decomposes by reaction with water in a corrosive environment to enable sacrificial corrosion of the metallic structure including one or more of [Zn phase], [Al phase] and [$MgZn_2$ phase] in the matrix of the [Al/Zn binary eutectic structure] or [Al/Zn/$MgZn_2$ ternary eutectic structure] and, further, that hydroxide of the resulting Mg forms a protective layer coating that suppresses a further advance of the corrosion.

The binary and ternary eutectic structures of the present invention described in detail here can both be observed and clearly distinguished using a general-purpose transmission electron microscope. Technologies are available that provide various methods for slicing the sectional structure of the plated steel sheet to a thinness capable of transmitting an electron beam, all of which are usable. One example is the focused ion beam machining method that thinly sections a sample using the sputtering phenomenon of a Ga ion beam. This method is a machining method in which an ion beam is directed perpendicularly onto the coating layer to cut the observed location as if with a chisel. It enables the desired sectional structure of the coating layer to be readily observed with a transmission electron microscope. Another common method is the ion milling method. In this, two coated steel sheets are overlaid with their coating layer surfaces against each other, formed into a square rod that is charged into a 3-mmφ copper tube and thinned by grinding in the sectional direction with a grinding machine, whereafter the center portion of the overlaid plating interface is further thinned by a dimpling machine. Finally in this method, a hole is formed in the interface portion using the Ar ion sputtering phenomenon and the peripheral portion is observed with a transmission electron microscope.

After the coating layer sectional structure portion has been reduced by such a method to around 0.2 $\mu$m, a distance enabling transmission electron microscopic observation, observation is conducted under the condition of an acceleration voltage of 200 kV. Although the electron gun can be one with a general-purpose tungsten filament or $LaB_6$ filament, an electron microscope equipped with a field emission electron gun is also usable.

In the present invention, the method of producing the Zn—Mg—Al—Si-alloy coated steel material is not particularly limited and an ordinary nonoxidization furnace hot-dip galvanizing method can be utilized. In the case of carrying out Ni precoating as an underlying layer, an ordinarily conducted precoating method can be utilized. The method is preferably one that conducts the hot-dip galvanizing after rapid low-temperature heating in a nonoxidizing or reducing atmosphere has been conducted subsequent to conducting Ni precoating.

In the present invention, in order to obtain a metallic structure of [primary crystal $Mg_2Si$ phase] interspersed in the solidified structure of the coating layer, it is preferable to regulate the Mg and Al in the coating bath to not less than 2 wt % and not less than 4 wt %, respectively, the bath temperature to not less than 450° C. and not greater than 650° C., and the cooling rate after coating to not less than 0.5° C./second.

The reason for making the Mg and Al of the coating bath not less than 2 wt % and not less than 4 wt %, respectively, is that when the Al and Mg contents are relatively low in the case of a Zn—Mg—Al—Si quaternary alloy, [Si phase] crystalizes as primary crystal and [primary crystal $Mg_2Si$ phase] cannot be obtained. The reason for setting the bath temperature at not less than 450° C. and not greater than 650° C. is because [primary crystal $Mg_2Si$ phase] does not crystallize at less than 450° C. and because, at greater than 650° C., a film forms on the coating surface and spoils its appearance. Although a greater cooling rate is advantageous because crystal refinement increases in proportion, production is conducted with it limited to not less than 0.5° C./second, the lower limit value for crystallizing [primary crystal $Mg_2Si$ phase] in a practical operation.

The reason for constituting the coating layer structure of a matrix phase of Zn—Mg—Al alloy and a Mg-system intermetallic compound phase dispersed therein at a specific size and volume percentage is that sliding resistance property of the coating layer and the corrosion resistance of machined portions is outstandingly good in this case.

The reason for defining the size of the Mg-system intermetallic compound as not less than 1 μm in terms of major diameter and its volume ratio as 0.1–50 vol % is that the machined portion sliding property and the fabricated portion corrosion resistance are excellent in this case. The major diameter as termed with respect to the present invention is the longest distance between tangents when two tangents are drawn at the periphery of the intermetallic compound. At a size of less than 1 μm and a volume ratio of less than 0.1%, a contribution by the Mg-system intermetallic compound to machinability and corrosion resistance of fabricated portions is no longer observed. When the volume ratio exceeds 50%, machinability deteriorates. Ten arbitrary coating layer sections were observed by SEM-EPMA (×1000) and the volume percentage of the Mg-system intermetallic compound defined by the invention was determined from the average value per unit area.

Although it is still not certain why the coating layer structure defined by the present invention achieves such excellent machinability (sliding property) and fabricated portion corrosion resistance, the reason is thought to be the combined action of the matrix phase coating layer working as binder and the dispersed Mg-system intermetallic compound working as a hard barrier phase manifesting scratch resistance. Moreover, it is thought that, in a corrosive environment, Mg dissolves out of Mg compounds to form a stable hydroxide coating over the exposed underlying metal at scratched portions, thus producing an inhibitor effect that works to enhance the corrosion resistance of fabricated portions. The reason for encompassing within the invention cases where Zn single phase and/or Al single phase are interspersed in the Zn—Mg—Al alloy matrix phase of the coating layer is that it was found that the Zn single phase and/or Al single phase, which sometimes gets mixed into the Zn—Mg—Al alloy matrix phase depending on the cooling conditions, has no effect on the scratch resistance even if interspersed in the coating layer but, rather, is advantageous from the aspect of plating adherence.

The reason for defining the Mg-system intermetallic compound as Mg—Si-system, Mg—Zn-system, Mg—Sn-system, Mg—Fe-system, Mg—Ni-system, Mg—Al-system or Mg—Ti-system is that among Mg-system intermetallic compounds these compounds make the sliding resistance property and the corrosion resistance particularly good. While the most preferable types include $MgZn_2$, $Mg_2Sn$ and $Mg_2Si$, the compounds are in no way limited to these.

In the present invention, there can be used as the underlying steel material of the Zn coated steel material or the Zn coated steel sheet not only such steel sheets as Al-killed steel sheet, very low carbon steel, high-strength steel and stainless steel but also such various steel materials as steel pipe, heavy plate, wire rod, bar steel and the like.

When the corrosion resistance of fabricated portions is to be enhanced, a Ni coating layer is provided as an underlying layer. The coating weight of the underlying Ni coating is preferably not greater than 2 g/m$^2$. When in excess of 2 g/m$^2$, coating adherence deteriorates. The lower limit of the coating weight is preferably 0.2 g/m$^2$. The reason for the better corrosion resistance of fabricated portions when a Ni coating layer is present under the coating is thought to be that Ni—Al—Fe—Zn compound forming at the coating layer-base metal interface functions as a kind of binder.

The chromate film serving as the intermediate layer of the painted steel sheet can be imparted by any method including, for example, electrolytic chromating, coat chromating, reactive chromating, resin chromating and the like. The function of the chromate film is to improve the adherence between the coating and the organic film and by this to enhance corrosion resistance.

The organic film constituting the upper layer of the painted steel sheet is not particularly limited. Examples include polyester resin, amino resin, epoxy resin, acrylic resin, urethane resin, fluororesin and the like. In a product subjected to particularly harsh machining, however, use of a thermosetting resin coating is most preferable. Examples of the thermosetting resin coating film include such polyester-system paints as epoxy-polyester paint, polyester paint, melamine-polyester paint and urethane-polyester paint, and acrylic paints.

Alkyd resin obtained by replacing part of the acid component of polyester resin with fatty acid component, oil-free alkyd resin that does not experience oil denaturing, polyester-system paint used together with melamine resin or polyisocyanate as curing agent, and acrylic paint combined with any of various crosslinking agents are better in processability than other paints and do not experience cracking of the coating even after severe machining.

In the present invention, the resin chromate film is a film, imparted at 10–300 mg/m$^2$ as metallic chromium, which is formed by applying and drying a resin chromate bath that is added with a water-soluble chromium compound of a chromium reducibility $\{CR^{3+}/(CR^{3+}+Cr^{6+})\times100(\text{wt }\%)\}$ of not greater than 70%, adjusted to a copresence of phosphoric acid and the water-soluble chromium compound such that a $H_3PO_4/CrO_3$ ratio (as chromic acid) is not less than 1 and a $H_3PO_4/Cr^{6+}$ ratio (as chromic acid) is not greater than 5, and blended with an organic resin to make the organic resin/$CrO_3$ ratio (as chromic acid) not less than 1.

Usable water-soluble chromium compounds include partially reduced chromates obtained by reducing anhydrous chromic acid, potassium (bi)chromate, sodium (bi) chromate, ammonium (bi)chromate or other such bichromates or chromates reduced with starch or the like. Use of partially reduced chromic acid obtained by reducing anhydrous chromic acid is preferable. The chromium reducibility of the water-soluble chromium compound is defined as not greater than 70% because bath stability during coating is inferior at greater than 70%.

As regards copresence of phosphoric acid and the water-soluble chromium compound, the $H_3PO_4/CrO_3$ ratio (as chromic acid) is first defined as not less than 1, because a bath life of around one month at a bath temperature of 40° C. cannot be obtained at a ratio of less than 1. A ratio of about 1.5–3.0 is preferable.

Next, the $H_3PO_4/Cr^{6+}$ ratio (as chromic acid) is defined as not greater than 5, because at a ratio of greater than 5 the surface of the zinc-coated steel sheet blackens when coated with the bath. A ratio of 1.5–5 is preferable.

The organic resin of the resin chromate bath is blended with the water-soluble chromium compound at a specified quantitative ratio. This ratio is defined as not less than 1 because the barrier effect produced by the resin is insufficient and corrosion resistance is inferior at an organic resin/$CrO_3$ ratio (as chromic acid) of less than 1. The ratio is preferably around 1–20.

The type of resin is not particular limited. Usable examples include, for instance, epoxy resin, acrylic acid, polyurethane resin, styrene-maleic resin, phenol resin, polyolefin resin, a mixture of two or more of these, and copolymers of any of these with other resins. Usable emulsion forms, while depending on combination with the functional group, include ones emulsion-polymerized using a surface active agent of low molecular weight and non-emulsion-polymerized ones using no surface active agent.

In order to further improve the corrosion resistance, scratch resistance and other capabilities of the surface-treated steel sheet, it is acceptable to add an aqueous colloid such as $SiO_2$ colloid or $TiO_2$ colloid to the resin chromate treatment bath of the present invention.

The coating weight of the resin chromate bath applied to the steel sheet surface is preferable 10–300 mg/m$^2$ as metallic chromium. At less than 10 mg/M$^2$, the corrosion resistance is insufficient, while greater than 300 mg/m$^2$ is uneconomical.

Usable methods of effecting the resin chromate treatment on the steel sheet include coating with a roll coater, coating with a wringer roll, coating by immersion and air-knife wiping, coating with a bar coater, spray coating, brush coating and the like. The drying after coating can also be effected by an ordinary method.

The chromium-free base metal treatment film layer used in the painted steel sheet of the present invention is characterized in containing tannin or tannic acid in a base of resin, particularly aqueous resin. The corrosion resistance of fabricated portions is synergistically enhanced by combining this base metal treatment film layer with the Zn—Mg—Al—Si-alloy coating layer.

The function of the tannin or tannic acid of the chromium-free base metal treatment film layer in the present invention is to react strongly with and adhere to the coating layer and, on the other hand, to adhere to the resin, particularly the aqueous resin. It is thought that the resin, particularly the aqueous resin, having the tannin or tannic acid adhered thereto adheres strongly to the resin coated thereon, whereby the painted steel sheet and the coating adhere strongly without use of the conventionally employed chromate treatment. It is also thought that portions are present where the tannin or the tannic acid is itself involved in the bonding of the coated steel sheet and the coating without the intermediacy of the resin, particularly the aqueous resin.

The aqueous resin of the chromium-free base metal treatment film layer of the present invention is defined to include, in addition to water-soluble resins, resins that are intrinsically insoluble but can assume a state finely dispersed in water in the manner of an emulsion or suspension. Resins usable as such an aqueous resin include, for example, polyolefin resin, acrylic olefin resin, polyurethane resin, polycarbonate resin, epoxy resin, polyester resin, alkyd resin, phenol resin, and other thermosetting resins. Crosslinkable resins are preferable. Particularly preferable resins are acrylic olefin resin, polyurethane resin, and mixtures of these resins. A mixture or polymerization product of two or more of these aqueous resins can be used.

In the presence of the resin, particularly the aqueous resin, the tannin or tannic acid strongly binds with both the Zn—Mg—Al—Si-alloy coating and the coating to improve the coating adherence markedly and, by this, enhance the corrosion resistance of machined portions. The tannin or tannic acid can be a hydrolyzable tannin, a condensed tannin, or a partially decomposed product of either of these. The tannin or tannic acid can be, but is not particularly limited to, hamamelitannin, sumac tannin, gallic tannin, algarrobilla tannin, divi-divi tannin, myrobolan tannin, valonia tannin, catechin and the like. A commercially available product such as "Tannic Acid: AL" (Fuji Chemical Industry Co., Ltd.) can be used.

The tannin or tannic acid content is preferably 0.2–50 parts by weight of tannin or tannic acid per 100 parts by weight of resin. When the tannin or tannic acid content is less than 0.2 parts by weight, no effect of its addition is observed and the coating adherence and the corrosion resistance of machined portions is insufficient. At greater than 50 parts by weight, problems arise such as that the corrosion resistance is degraded rather than enhanced and that the treatment solution gels when stored for a long time.

Further addition of silica improves resistance to abrasive scratching, coating adherence and corrosion resistance. The fine-grain silica in the present invention is one whose microscopic particle diameter enables it to assume a stable water-dispersed state when dispersed in water. The fine-grain silica of this type must contain little sodium and other impurities and be weakly alkaline but is otherwise not particularly limited. There can be used a commercially available silica such as "Snowtex N" (product of Nissan Chemical Industries, Ltd.) or "Adelite AT-20N" (product of Asahi Denka Kogyo K.K.).

The fine-grain silica content is preferably 10–500 parts by weight as solid content per 100 parts by weight of resin. At less than 10 parts by weight, the effect of addition is slight, while a content of greater than 500 parts by weight is uneconomical because the effect of corrosion resistance improvement saturates.

Surface active agent, rust inhibitor, foaming agent, pigment and the like can be added as required. An etching fluoride can be added to enhance adherence. Usable etching fluorides include, for example, zinc fluoride tetrahydrate, zinc hexafluorosilicate hexahydrate and the like. Similarly, a silane coupling agent can be added for the purpose of upgrading adherence. As silane coupling agents can be listed, for example, γ-(2-aminoethyl) aminopropyltrimethoxy silane, γ-(2-aminoethyl) aminopropylmethyltrimethoxy silane, amino silane, γ-methacryloxypropyltrimethoxy silane, N-β-(N-vinylbenzilaminoethyl)-γ-aminopropyltrimethoxy silane, γ-glycidoxypropyl)trimethoxy silane, γ-mercaptopropyltrimethoxy silane, methyltrimethoxy silane, vinyltrimethoxy silane, octadecyldimethyl[3-(trimethoxysilyl)propyl]ammonium chloride, γ-chloropropylmethyldimethoxy silane, γ-mercaptopropylmethyldimethoxy silane, methyltrichloro silane, dimethyldichloro silane, trimethylchloro silane and the like.

Another form of the chromium-free base metal treatment film layer used on the painted steel sheet of the present invention is characterized in containing a silane coupling agent in a base of resin, particularly aqueous resin. The corrosion resistance of fabricated portions is synergistically enhanced by combining this base metal treatment film layer with the Zn—Mg—Al—Si-alloy coating layer. The aqueous resin of the base metal treatment film layer is defined to include, in addition to water-soluble resins, resins that are intrinsically insoluble but can assume a state finely dispersed in water in the manner of an emulsion or suspension. Resins usable as such an aqueous resin include, for example, polyolefin resin, acrylic olefin resin, polyurethane resin, polycarbonate resin, epoxy resin, polyester resin, alkyd resin, phenol resin, and other thermosetting resins. Crosslinkable resins are preferable. Particularly preferable resins are acrylic olefin resin, polyurethane resin, and mixtures of these resins. A mixture or polymerization product of two or more of these aqueous resins can be used.

In the presence of the resin, particularly the aqueous resin, the silane coupling agent strongly binds with both the Zn—Mg—Al—Si-alloy coating and the coating to improve the coating adherence markedly and, by this, enhance the corrosion resistance of machined portions. As silane coupling agents can be listed, for example, γ-(2-aminoethyl) aminopropyltrimethoxy silane, γ-(2-aminoethyl) aminopropylmethyltrimethoxy silane, amino silane, γ-methacryloxypropyltrimethoxy silane, N-β-(N-vinylbenzilaminoethyl)-γ-aminopropyltrimethoxy silane, γ-glycidoxypropyl)trimethoxy silane, γ-mercaptopropyltrimethoxy silane, methyltrimethoxy silane, vinyltrimethoxy silane, octadecyldimethyl[3-(trimethoxysilyl)propyl]ammonium chloride, γ-chloropropylmethyldimethoxy silane, γ-mercaptopropylmethyldimethoxy silane, methyltrichloro silane, dimethyldichloro silane, trimethylchloro silane and the like.

The silane coupling agent content is preferably 0.1–3000 parts by weight as solids content per 100 parts by weight of resin. At less than 0.1 parts by weight, adequate adherence cannot be obtained during fabrication and the corrosion resistance is inferior because the amount of the silane coupling agent is insufficient. Greater than 3000 parts by weight is uneconomical because the effect of adherence improvement saturates. Further addition of silica improves resistance to abrasive scratching, coating adherence and corrosion resistance. The fine-grain silica of the present invention refers generally to silica having, as a feature, a microscopic particle diameter that enables it to maintain a stable water-dispersed state with no sedimentation observed semipermanently when dispersed in water. The fine-grain silica of this type must contain little sodium and other impurities and be weakly alkaline but is otherwise not particularly limited. There can be used a commercially available silica such as "Snowtex N" (product of Nissan Chemical Industries, Ltd.) or "Adelite AT-20N" (product of Asahi Denka Kogyo K.K.).

The fine-grain silica content is preferably 1–2000 parts by weight as solids content per 100 parts by weight of resin. A content of 10–400 parts by weight is more preferable. At less than 1 part by weight, the effect of addition is slight, while a content of greater than 2000 parts by weight is uneconomical because the effect of corrosion resistance improvement saturates.

Addition of an etching fluoride enhances coating adherence. Usable etching fluorides include zinc fluoride tetrahydrate, zinc hexafluorosilicate hexahydrate and the like. The etching fluoride content is preferably 0.1–1000 parts by weight as solids content per 100 parts by weight of resin. At less than 0.1 part by weight, the effect of addition is slight, while a content of greater than 1000 parts by weight is uneconomical because the etching effect saturates and the coating adherence is not improved.

Surface active agent, rust inhibitor, foaming agent, and the like can be added as required.

Applicable methods of imparting the chromium-free base metal treatment film layer include, but are not particularly limited to, generally known coating methods such as, for example, roll coating, air spraying and airless spraying. Drying and baking after coating can, with consideration to the polymerization or curing reaction of the resin, be effected by a known method such as by use of a hot-air furnace, an induction heating furnace, an infrared furnace or the like, or by a method using a combination of these. Depending on the type of aqueous resin used, moreover, curing by ultraviolet rays or an electron beam is also possible. Otherwise, drying can be effected spontaneously with no use of forced drying, or the Zn—Mg—Al—Si-alloy coated steel sheet can be preheated before coating and drying then be effected spontaneously.

The coating weight of the chromium-free base metal treatment film layer after drying is preferably 10–3000 mg/m$^2$. At less than 10 mg/m$^2$, the adherence is inferior and corrosion resistance of machined portions insufficient. On the other hand, a content greater than 3000 mg/m$^2$ is not only uneconomical but also degrades processability and in addition makes corrosion resistance inferior.

The painted steel sheet of the present invention is characterized in having an organic film layer on a base metal-treated Zn—Mg—Al—Si-alloy coated steel sheet. As the organic film can be used polyolefin resin, acrylic resin, urethane resin, epoxy resin, polyester resin, vinyl chloride resin, fluororesin, butyral resin, polycarbonate resin, phenol resin, and the like. Mixtures and copolymers of these can also be used. They can also be used together with isocyanate resin, amino resin, silane coupling agent or titanium coupling agent as auxiliary components. Since the coated steel sheet according to the present invention is, in many cases, used as it is without mending after fabrication, a resin system of polyester resin crosslinked with melamine, a resin system of polyester resin crosslinked with urethane resin (isocyanate, isocyanate resin), a vinyl chloride resin system, a fluororesin system (solvent-soluble type, type in dispersion mixture with acrylic resin) are preferable in applications subjected to harsh fabrication.

The thickness of the organic film layer of the present invention is suitably 1 μm–100 μm. The reason for defining the thickness as not less than 1 μm is that at less than 1 μm, corrosion resistance cannot be secured. The reason for defining the thickness as not greater than 100 μm is that a thickness greater than 100 μm is disadvantageous from the aspect of cost. The thickness is preferably not greater than 20 μm. The organic film layer can be a single layer or a composite layer. The organic film used in the method of the present invention can, as required, be blended with additives such as plasticizer, antioxidant, heat stabilizer, inorganic particles, pigment, organic lubricant and the like.

When the organic film layer of the present invention is imparted with color, it has a characteristic of enabling use as it is without further coating thereon. The organic film layer is colored by pigment, dye or the like. As the pigment can used be known ones irrespective of whether inorganic, organic or a composite of both types. Examples that can be listed include cyanine pigments such as titanium white, zinc yellow, alumina white and cyanine blue, carbon black, black iron oxide, red iron oxide, yellow iron oxide, molybdate orange, Hansa yellow, pyrazolone orange, azoic pigments, indigo, Prussian blue, condensed polycyclic pigment, and the like. Others that can be mentioned include metal fragment/powder/pearl pigment, mica pigment, indigoid dye, sulfur dye, phthalocyanine dye, diphenylmethane dye, nitro dye, acridine dye, and the like. The pigment concentration of the organic film layer is not particularly limited and it suffices to determine it with reference to the required color and/or concealing power.

Pigments not directly related to coloration and additives that can be added include, for example, pigments such as barium sulfate, calcium carbonate, kaolin clay and the like, additives such as defoaming agent, leveling agent, dispersion assisting agent and the like, organic wax components of the polyethylene, polypropylene, ester, paraffin, fluorine system and the like, inorganic wax components such as molybdenum disulfate, and a diluent, a solvent, water and the like for reducing coating material viscosity.

The amount of anti-rust pigment added is preferably 1–40 wt % based on the solid content of the film. At less than 1 wt %, the improvement in corrosion resistance is insufficient, while at greater than 40 wt %, processability declines, detachment of the organic film layer occurs during fabrication, and corrosion resistance becomes inferior.

The thickness of the undercoating containing anti-rust pigment is preferably not greater than 30 μm. At greater than 30 μm, processability declines, detachment of the organic film layer occurs during fabrication, and corrosion resistance also becomes inferior.

The undercoating containing anti-rust pigment can be applied by a known method. Examples include roll coating, curtain coating, air spraying, airless spraying, immersion, brush coating, bar coating and the like. The undercoating is thereafter dried and cured by heating with hot air, induction heat, near infrared, far infrared or the like. If the resin of the organic film layer is curable with an electron beam or ultraviolet rays, it is cured by exposure to these. These methods can be used in combination.

Although the thickness of the colored organic film layer is not particularly limited, the dry thickness is preferably not less than 5 μm for obtaining a uniform appearance. Although the film thickness has no upper limit, the dry thickness by a single coating in the case of continuous coating with coiling is usually about 50 μm, while in the case of discontinuous coating of cut sheet, baking can be conducted under mild conditions and the upper limit thickness rises to around 50 μm. When sheets are treated individually by spray coating or the like, the upper limit thickness rises further.

EXAMPLES

The present invention will now be explained specifically with reference to examples.

Example 1

Cold-rolled sheets of 0.8 mm thickness were prepared and subjected to hot-dip galvanizing for 3 seconds in 450–650° C. Zn—Mg—Al—Si alloy coating baths differing in the amounts of Mg, Al and Si in the baths and then adjusted to a coating having a coating weight of 135 g/m$^2$ by $N_2$ wiping. The coating layer compositions of the obtained Zn coated steel sheets are shown in Table 1. Some of the samples were provided with Ni precoating layers as underlying layers.

Each coated steel sheet produced in the foregoing manner was cut to 150×70 mm, bent 180 degrees, sprayed for 2000 hours with 5%, 35° C. brine, and then examined for a red rust area ratio. A rating of 3 or higher was defined as passing.

(Rating): (Red rust area ratio)

5: Less than 5%

4: 5% to less than 10%

3: 10% to less than 20%

2: 20% to less than 30%

1: 30% or greater

The results of the evaluation are shown in Table 1. The present invention materials all exhibited excellent corrosion resistance.

TABLE 1

| No | Ni precoating (g/m$^2$) | Composition of hot-dip galvanizing layer (wt %) Mg | Al | Si | Corrosion resistance rating | Remark |
|---|---|---|---|---|---|---|
| 1 | None | 1 | 2 | 0.06 | 3 | Invention |
| 2 | None | 1 | 19 | 0.6 | 3 | Example |
| 3 | None | 3 | 5 | 0.15 | 4 | |
| 4 | None | 4 | 8 | 0.25 | 4 | |
| 5 | None | 5 | 10 | 0.3 | 4 | |
| 6 | None | 5 | 15 | 0.45 | 4 | |
| 7 | None | 5 | 15 | 1.5 | 4 | |
| 8 | None | 6 | 2 | 0.06 | 3 | |
| 9 | None | 6 | 4 | 0.12 | 4 | |
| 10 | None | 10 | 2 | 0.06 | 3 | |
| 11 | None | 10 | 10 | 0.3 | 4 | |
| 12 | 0.5 | 3 | 5 | 0.15 | 5 | |
| 13 | 0.5 | 4 | 8 | 0.25 | 5 | |
| 14 | 0.5 | 5 | 10 | 0.3 | 5 | |
| 15 | 0.5 | 6 | 4 | 0.12 | 5 | |
| 16 | 3 | 5 | 10 | 0.3 | 3 | |
| 17 | None | 0 | 0.2 | 0 | 1 | Comparative |
| 18 | None | 0.5 | 20 | 0.6 | 1 | Example |
| 19 | None | 5 | 20 | 0.6 | 2 | |
| 20 | None | 12 | 1 | 0.03 | 2 | |
| 21 | None | 12 | 15 | 0.45 | 2 | |
| 22 | None | 5 | 15 | 0 | 1 | |
| 23 | None | 5 | 15 | 3 | 2 | |

Example 2

Cold-rolled sheets of 0.8 mm thickness were prepared and subjected to hot-dip galvanizing for 3 seconds in 450–650° C. Zn—Mg—Al—Si alloy coating baths, differing in the amounts of Mg, Al and Si in the baths, and then adjusted to a coating having a coating weight of 135 g/m$^2$ by $N_2$ wiping. The coating layer compositions of the obtained Zn coated steel sheets are shown in Table 2. Some of the samples were provided with Ni precoating layers as underlying layers.

The Zn—Mg—Al—Si alloy coated steel sheets were then immersed in a coating-type chromate treatment solution to conduct chromate treatment. The coating weight of the chromate film was made 50 mg/m$^2$ as Cr. An epoxy-polyester paint was applied on the chromate film as primer with a bar coater and baked in a hot-air drying furnace to adjust the thickness to 5 μm. As a top coat, polyester paint was applied with a bar coater and baked in a hot-air drying furnace to adjust the thickness to 20 μm.

Each painted steel sheet produced in the foregoing manner was bent 180 degrees and the red rust occurrence condition of the bend after 120 cycles of CCT was evaluated and assigned one of the following ratings. One cycle of CCT consisted of SST 2 hr→drying 4 hr→damping 2 hr. A rating of 3 or higher was defined as passing.

(Rating): (Red rust area ratio)

5: Less than 5%

4: 5% to less than 10%

3: 10% to less than 20%

2: 20% to less than 30%

1: 30% or greater

The results of the evaluation are shown in Table 2. The present invention materials all exhibited excellent corrosion resistance.

TABLE 2

| No | Ni precoating (g/m²) | Composition of hot-dip galvanizing layer (wt %) Mg | Al | Si | Corrosion resistance rating | Remark |
|---|---|---|---|---|---|---|
| 1 | None | 1 | 2 | 0.06 | 3 | Invention |
| 2 | None | 1 | 19 | 0.6 | 4 | Example |
| 3 | None | 3 | 5 | 0.15 | 4 | |
| 4 | None | 4 | 8 | 0.25 | 4 | |
| 5 | None | 5 | 10 | 0.3 | 4 | |
| 6 | None | 5 | 15 | 0.45 | 4 | |
| 7 | None | 5 | 15 | 1.5 | 4 | |
| 8 | None | 6 | 2 | 0.06 | 3 | |
| 9 | None | 6 | 4 | 0.12 | 4 | |
| 10 | None | 10 | 2 | 0.06 | 3 | |
| 11 | None | 10 | 10 | 0.3 | 4 | |
| 12 | 0.5 | 3 | 5 | 0.15 | 5 | |
| 13 | 0.5 | 4 | 8 | 0.25 | 5 | |
| 14 | 0.5 | 5 | 10 | 0.3 | 5 | |
| 15 | 0.5 | 6 | 4 | 0.12 | 5 | |
| 16 | 3 | 5 | 10 | 0.3 | 3 | |
| 17 | None | 0 | 0.2 | 0 | 1 | Comparative |
| 18 | None | 0.5 | 20 | 0.6 | 1 | Example |
| 19 | None | 5 | 20 | 0.6 | 1 | |
| 20 | None | 12 | 1 | 0.03 | 2 | |
| 21 | None | 12 | 15 | 0.45 | 2 | |
| 22 | None | 5 | 15 | 0 | 1 | |
| 23 | None | 5 | 15 | 3 | 2 | |

Example 3

Cold-rolled sheet of 0.8 mm thickness was prepared and subjected to hot-dip galvanizing for 3 seconds in a 450° C. Zn—Mg—Al—Si alloy coating bath and then adjusted to a coating having a coating weight of 135 g/m² by $N_2$ wiping. A Ni coating layer was imparted as an underlying layer. The coating layer composition of the obtained Zn coated steel sheet comprised 3% of Mg, 5% of Al and 0.15% of Si.

The Zn—Mg—Al—Si alloy coated steel sheet was then immersed in a coating-type chromate treatment solution to conduct chromate treatment. The coating weight of the chromate film was made 50 mg/m² as Cr.

Epoxy-polyester paint, polyester paint, melamine-polyester paint, urethane-polyester paint or acrylic paint was applied with a bar coater and baked in a hot-air drying furnace to adjust the thickness as shown in Table 3 and Table 4.

Similarly coated hot-dip galvanized steel sheets were used as comparative examples.

Each painted steel sheet produced in the foregoing manner was bent 180 degrees and the red rust occurrence condition of the bend after 120 cycles of CCT was evaluated and assigned one of the following ratings. One cycle of CCT consisted of SST 2 hr→drying 4 hr→damping 2 hr. A rating of 3 or higher was defined as passing.

(Rating): (Red rust area ratio)

5: Less than 5%

4: 5% to less than 10%

3: 10% to less than 20%

2: 20% to less than 30%

1: 30% or greater

The results of the evaluation are shown in Table 3 and Table 4. The present invention materials all exhibited excellent corrosion resistance.

TABLE 3

| No | Painting type | Thickness (μm) | Coating type | Corrosion resistance rating | Remark |
|---|---|---|---|---|---|
| 1 | Polyester | 20 | Hot-dip | 2 | Comparative |
| 2 | paint | 100 | galva-nizing | 1 | Example |
| 3 | | 5 | Zn—Mg— | 4 | Invention |
| 4 | | 10 | Al—Si | 5 | Example |
| 5 | | 20 | alloy | 5 | |
| 6 | | 50 | coating | 5 | |
| 7 | | 100 | | 4 | |
| 8 | Epoxy- | 20 | Hot-dip | 2 | Comparative |
| 9 | polyester paint | 100 | galva-nizing | 1 | Example |
| 10 | | 5 | Zn—Mg— | 4 | Invention |
| 11 | | 10 | Al—Si | 5 | Example |
| 12 | | 20 | alloy | 5 | |
| 13 | | 50 | coating | 5 | |
| 14 | | 100 | | 4 | |
| 15 | Melamine- | 20 | Hot-dip | 2 | Comparative |
| 16 | polyester paint | 100 | galva-nizing | 1 | Example |
| 17 | | 5 | Zn—Mg— | 4 | Invention |
| 18 | | 10 | Al—Si | 5 | Example |
| 19 | | 20 | alloy | 5 | |
| 20 | | 50 | coating | 5 | |
| 21 | | 100 | | 4 | |
| 22 | Urethane- | 20 | Hot-dip | 2 | Comparative |
| 23 | polyester paint | 100 | galva-nizing | 1 | Example |
| 24 | | 5 | Zn—Mg— | 4 | Invention |
| 25 | | 10 | Al—Si | 5 | Example |
| 26 | | 20 | alloy | 5 | |
| 27 | | 50 | coating | 5 | |
| 28 | | 100 | | 4 | |
| 29 | Acrylic | 20 | Hot-dip | 2 | Comparative |
| 30 | paint | 100 | galva-nizing | 1 | Example |
| 31 | | 5 | Zn—Mg— | 4 | Invention |
| 32 | | 10 | Al—Si | 5 | Example |
| 33 | | 20 | alloy coating | 5 | |

TABLE 4

| No | Painting type | Thickness (μm) | Coating type | Corrosion resistance rating | Remark |
|---|---|---|---|---|---|
| 34 | Acrylic | 50 | Zn—Mg— | 5 | Invention |
| 35 | paint | 100 | Al—Si alloy coating | 4 | Example |
| 36 | Epoxy- | 5 + 15 | Hot-dip | 2 | Comparative |
| 37 | polyester paint + | 5 + 95 | galva-nizing | 1 | Example |
| 38 | Polyester | 5 + 5 | Zn—Mg— | 5 | Invention |
| 39 | paint | 5 + 10 | Al—Si | 5 | Example |
| 40 | | 5 + 20 | alloy | 5 | |
| 41 | | 5 + 50 | coating | 5 | |
| 42 | | 5 + 95 | | 4 | |
| 43 | Epoxy- | 5 + 15 | Hot-dip | 2 | Comparative |
| 44 | polyester paint + Melamine- | 5 + 95 | zinc galva-nizing | 1 | Example |
| 45 | polyester | 5 + 5 | Zn—Mg— | 5 | Invention |
| 46 | paint | 5 + 10 | Al—Si | 5 | Example |
| 47 | | 5 + 20 | alloy | 5 | |
| 48 | | 5 + 50 | coating | 5 | |
| 49 | | 5 + 95 | | 4 | |
| 50 | Melamine- | 5 + 15 | Hot-dip | 2 | Comparative |
| 51 | polyester paint + | 5 + 95 | galva-nizing | 1 | Example |
| 52 | Urethane- | 5 + 5 | Zn—Mg— | 5 | Invention |
| 53 | polyester | 5 + 10 | Al—Si | 5 | Example |

TABLE 4-continued

| No | Painting type | Thickness (μm) | Coating type | Corrosion resistance rating | Remark |
|---|---|---|---|---|---|
| 54 | paint | 5 + 20 | alloy | 5 | |
| 55 | | 5 + 50 | coating | 5 | |
| 56 | | 5 + 95 | | 4 | |
| 57 | Epoxy- | 5 + 15 | Hot-dip | 2 | Comparative |
| 58 | polyester paint + | 5 + 95 | galva-nizing | 1 | Example |
| 59 | Acrylic | 5 + 5 | Zn—Mg— | 5 | Invention |
| 60 | paint | 5 + 10 | Al—Si | 5 | Example |
| 61 | | 5 + 20 | alloy | 5 | |
| 62 | | 5 + 50 | coating | 5 | |
| 63 | | 5 + 95 | | 4 | |

Example 4

Cold-rolled sheets of 0.8 mm thickness were prepared and subjected to hot-dip galvanizing for 3 seconds in 450–650° C. Zn—Mg—Al—Si alloy coating baths, differing in the amounts of Mg, Al and Si in the baths, and then adjusted to a coating having a coating weight of 135 g/m$^2$ by $N_2$ wiping. The coating layer compositions of the obtained Zn coated steel sheets are shown in Table 5. Some of the samples were provided with Ni precoating layers as underlying layers.

A resin chromate bath was added with a water-soluble chromium compound of a chromium reducibility $\{CR^{3+}/(CR^{3+}+Cr^{6+})\times 100(\text{wt }\%)\}$ of 40(wt %), adjusted to a copresence of phosphoric acid and the water-soluble chromium compound such that the $H_3PO_4/CrO_3$ ratio (as chromic acid) was 2 and the $H_3PO_4/Cr^{6+}$ ratio (as chromic acid) was 3.3, blended with an organic resin to make the organic resin/$CrO_3$ ratio (as chromic acid) 6.7 and blended with $SiO_2$ colloid to make the $SiO_2/CrO_3$ ratio (as chromic acid) 3, and the Zn—Mg—Al—Si alloy coated steel sheets were coated therewith and dried to conduct resin chromate treatment. The coating weight of the resin chromate film was made 50 mg/m$^2$ as Cr. Unemulsified type acrylic emulsion was used as the organic resin.

Each coated steel sheet produced in the foregoing manner was cut to 150×70 mm, sprayed for 240 hours with 5%, 35° C. brine, and then examined for a white rust area ratio. A rating of 3 or higher was defined as passing.

(Rating): (White rust area ratio)

5: No white rust

4: White rust occurence rate Less than 10%

3: White rust occurence rate 10% to less than 20%

2: White rust occurence rate 20% to less than 30%

1: White rust occurence rate 30% or greater

Zn coated steel sheets similarly cut to 150×70 mm were bent 180 degrees at the middle and subjected to 30 cycles of CCT, where each cycle consisted of brine spraying 2 hr→drying 4 hr→damping 2 hr. Corrosion resistance was evaluated by rating the red rust occurrence condition using the following scale. A rating of 3 or higher was defined as passing.

(Rating): (Red rust area ratio)

5: Red rust occurance rate Less than 5%

4: Red rust occurence rate 5% to less than 10%

3: Red rust occurence rate 10% to less than 20%

2: Red rust occurence rate 20% to less than 30%

1: Red rust occurence rate 30% or greater

The results of the evaluations are shown in Table 5. The present invention materials all exhibited excellent corrosion resistance.

TABLE 5

| No | Ni precoating (g/m$^2$) | Composition of hot-dip galvanizing layer (wt %) Mg | Al | Si | White rust property | Corrosion resistance rating | Remark |
|---|---|---|---|---|---|---|---|
| 1 | None | 1 | 2 | 0.06 | 3 | 3 | Invention |
| 2 | None | 1 | 19 | 0.6 | 4 | 3 | Example |
| 3 | None | 3 | 5 | 0.15 | 4 | 4 | |
| 4 | None | 4 | 8 | 0.25 | 4 | 4 | |
| 5 | None | 5 | 10 | 0.3 | 4 | 4 | |
| 6 | None | 5 | 15 | 0.45 | 4 | 4 | |
| 7 | None | 5 | 15 | 1.5 | 4 | 4 | |
| 8 | None | 6 | 2 | 0.06 | 3 | 4 | |
| 9 | None | 6 | 4 | 0.12 | 4 | 4 | |
| 10 | None | 10 | 2 | 0.06 | 3 | 3 | |
| 11 | None | 10 | 10 | 0.3 | 4 | 4 | |
| 12 | 0.5 | 3 | 5 | 0.15 | 4 | 5 | |
| 13 | 0.5 | 4 | 8 | 0.25 | 4 | 5 | |
| 14 | 0.5 | 5 | 10 | 0.3 | 4 | 5 | |
| 15 | 0.5 | 6 | 4 | 0.12 | 4 | 5 | |
| 16 | 3 | 5 | 10 | 0.3 | 4 | 3 | |
| 17 | None | 0 | 0.2 | 0 | 1 | 1 | Comparative |
| 18 | None | 0.5 | 20 | 0.6 | 4 | 1 | Example |
| 19 | None | 5 | 20 | 0.6 | 4 | 2 | |
| 20 | None | 12 | 1 | 0.03 | 2 | 2 | |
| 21 | None | 12 | 15 | 0.45 | 4 | 2 | |
| 22 | None | 5 | 15 | 0 | 4 | 1 | |
| 23 | None | 5 | 15 | 3 | 4 | 2 | |

Example 5

Cold-rolled sheet of 0.8 mm thickness was prepared and subjected to hot-dip galvanizing for 3 seconds in a 550° C. Zn—Mg—Al—Si alloy coating bath and then adjusted to a coating having a coating weight of 135 g/m$^2$ by $N_2$ wiping. A Ni precoating layer was imparted as an underlying layer. The coating layer composition of the obtained Zn coated steel sheet comprised 3% of Mg, 5% of Al and 0.15% of Si.

The Zn—Mg—Al—Si alloy coated steel sheet was then coated in resin chromate baths adjusted to the compositions shown in Table 6 and Table 7 and dried to conduct chromate treatment. $SiO_2$ colloid was blended with the chromate baths to make the $SiO_2/CrO_3$ ratio (as chromic acid) 3. Unemulsified type acrylic emulsion and water-soluble acrylic resin were used as the organic resin. The coating weight was made 3–300 g/m$^2$ as metallic chromium.

The performance of the coated steel sheets produced in the foregoing manner was evaluated regarding the following items.

1) Stability: The resin chromate baths were placed in a 40° C. drier and the number of days up to occurrence of gelation, sedimentation, separation and the like was recorded. Ones for which 25 days or more passed were judged to be good in bath stability.

2) Color tone: The YI yellowness of samples was measured using a color-difference meter. The white appearance exhibited increases with decreasing YI. A rating of 3 or higher on the following scale was defined as passing.

(Rating): (Color tone)

4: YI<−1.0

3: −1<YI<1

2: 1<YI<5

1: 5<YI

3) Corrosion resistance: Each coated steel sheet was cut to 150×70 mm, sprayed for 240 hours with 5%, 35° C. brine, and then examined for white rust area ratio. A rating of 3 or higher was defined as passing.

(Rating): (White rust area ratio)

5: No white rust

4: White rust occurence rate Less than 10%

3: White rust occurence rate 10% to less than 20%

2: White rust occurence rate 20% to less than 30%

1: White rust occurence rate 30% or greater

The results of the evaluations are shown in Table 6 and Table 7. The present invention materials all exhibited excellent corrosion resistance.

TABLE 6

| | Sample specifications | | | | | | | | Performance evaluation results | | | |
|---|---|---|---|---|---|---|---|---|---|---|---|---|
| No | $CrO_3$ (g/l) | Chromium reducibility (%) | $H_3PO_4$ (g/l) | $H_3PO_4/Cr^{(VI)}O_3$ | $H_3PO_4/CrO_3$ | Resin type | Resin/Cr $CrO_3$ | Cr coating weight ($mg/m^2$) | Color tone (YI value) | Bath stability (days) | Corrosion resistance | Remark |
| 1 | 5 | 40 | 45 | 15 | 9 | A | 20 | 50 | 1 | ≧30 | 2 | Comparative |
| 2 | 3.3 | 40 | 30 | 15 | 9 | A | 20 | 50 | 1 | ≧30 | 2 | Example |
| 3 | 1.7 | 40 | 15 | 15 | 9 | A | 20 | 50 | 1 | ≧30 | 2 | |
| 4 | 10 | 40 | 45 | 7.5 | 4.5 | A | 10 | 50 | 1 | ≧30 | 3 | |
| 5 | 6.7 | 40 | 30 | 7.5 | 4.5 | A | 10 | 50 | 1 | ≧30 | 3 | |
| 6 | 3.3 | 40 | 15 | 7.5 | 4.5 | A | 10 | 50 | 2 | ≧30 | 3 | |
| 7 | 15 | 40 | 45 | 5 | 3 | A | 6.7 | 50 | 4 | ≧30 | 4 | Invention |
| 8 | 10 | 40 | 30 | 5 | 3 | A | 6.7 | 50 | 4 | ≧30 | 4 | Example |
| 9 | 5 | 40 | 15 | 5 | 3 | A | 6.7 | 50 | 4 | ≧30 | 4 | |
| 10 | 15 | 40 | 30 | 3.3 | 2 | A | 6.7 | 50 | 4 | ≧30 | 4 | |
| 11 | 10 | 40 | 20 | 3.3 | 2 | A | 6.7 | 50 | 4 | ≧30 | 4 | |
| 12 | 5 | 40 | 10 | 3.3 | 2 | A | 6.7 | 50 | 4 | ≧30 | 4 | |
| 13 | 15 | 40 | 15 | 1.7 | 1 | A | 6.7 | 50 | 4 | ≧30 | 4 | |
| 14 | 10 | 40 | 10 | 1.7 | 1 | A | 6.7 | 50 | 4 | 25 | 4 | |
| 15 | 5 | 40 | 5 | 1.7 | 1 | A | 6.7 | 50 | 4 | 25 | 4 | |
| 16 | 15 | 40 | 30 | 3.3 | 2 | A | 0.5 | 50 | 3 | ≧30 | 2 | Comparative |
| 17 | 15 | 40 | 30 | 3.3 | 2 | A | 6.7 | 3 | 4 | ≧30 | 1 | Example |
| 18 | 15 | 40 | 30 | 3.3 | 2 | A | 6.7 | 150 | 4 | ≧30 | 5 | Invention |
| 19 | 15 | 40 | 30 | 3.3 | 2 | A | 6.7 | 300 | 3 | ≧30 | 5 | Example |
| 20 | 5 | 50 | 45 | 18 | 9 | A | 20 | 50 | 1 | ≧30 | 2 | Comparative |
| 21 | 3.3 | 50 | 30 | 18 | 9 | A | 20 | 50 | 1 | ≧30 | 2 | Example |
| 22 | 1.7 | 50 | 15 | 18 | 9 | A | 20 | 50 | 1 | ≧30 | 2 | |
| 23 | 10 | 50 | 45 | 9 | 4.5 | A | 10 | 50 | 1 | ≧30 | 2 | |
| 24 | 6.7 | 50 | 30 | 9 | 4.5 | A | 10 | 50 | 1 | ≧30 | 3 | |
| 25 | 3.3 | 50 | 15 | 9 | 4.5 | A | 10 | 50 | 2 | ≧30 | 3 | |
| 26 | 15 | 50 | 45 | 6 | 3 | A | 6.7 | 50 | 2 | ≧30 | 4 | |
| 27 | 10 | 50 | 30 | 6 | 3 | A | 6.7 | 50 | 2 | ≧30 | 4 | |
| 28 | 5 | 40 | 15 | 6 | 3 | A | 6.7 | 50 | 2 | ≧30 | 4 | |
| 29 | 15 | 50 | 30 | 4 | 2 | A | 6.7 | 50 | 4 | ≧30 | 4 | Invention |
| 30 | 10 | 50 | 20 | 4 | 2 | A | 6.7 | 50 | 4 | ≧30 | 4 | Example |

Resin A: Unemulsified type acrylic emulsion
Resin B: Water-soluble acrylic resin

TABLE 7

| | Sample specifications | | | | | | | | Performance evaluation results | | | |
|---|---|---|---|---|---|---|---|---|---|---|---|---|
| No | $CrO_3$ (g/l) | Chromium reducibility (%) | $H_3PO_4$ (g/l) | $H_3PO_4/Cr^{(VI)}O_3$ | $H_3PO_4/CrO_3$ | Resin type | Resin/Cr $CrO_3$ | Cr coating weight ($mg/m^2$) | Color tone (YI value) | Bath stability (days) | Corrosion resistance | Remark |
| 31 | 5 | 50 | 10 | 4 | 2 | A | 6.7 | 50 | 4 | ≧30 | 4 | Invention |
| 32 | 15 | 50 | 15 | 2 | 1 | A | 6.7 | 50 | 4 | ≧30 | 4 | Example |
| 33 | 10 | 50 | 10 | 2 | 1 | A | 6.7 | 50 | 4 | 25 | 4 | |
| 34 | 5 | 50 | 5 | 2 | 1 | A | 6.7 | 50 | 4 | 25 | 4 | |
| 35 | 15 | 50 | 30 | 4 | 2 | A | 1 | 50 | 4 | ≧30 | 4 | |
| 36 | 10 | 50 | 20 | 4 | 2 | A | 1 | 50 | 4 | ≧30 | 4 | |
| 37 | 5 | 50 | 10 | 4 | 2 | A | 1 | 50 | 4 | ≧30 | 4 | |
| 38 | 15 | 0 | 15 | 1 | 1 | A | 6.7 | 50 | 4 | ≧30 | 4 | |
| 39 | 15 | 10 | 15 | 1.1 | 1 | A | 6.7 | 50 | 4 | ≧30 | 4 | |
| 40 | 15 | 20 | 15 | 1.3 | 1 | A | 6.7 | 50 | 4 | ≧30 | 4 | |
| 41 | 15 | 30 | 15 | 1.4 | 1 | A | 6.7 | 50 | 4 | ≧30 | 4 | |
| 42 | 15 | 60 | 15 | 2.5 | 1 | A | 6.7 | 50 | 4 | 28 | 4 | |
| 43 | 15 | 70 | 15 | 3.3 | 1 | A | 6.7 | 50 | 3 | 25 | 3 | |
| 44 | 15 | 80 | 15 | 5 | 1 | A | 6.7 | 50 | 3 | 5 | 3 | Comparative |
| 45 | 15 | 0 | 7.5 | 1 | 0.5 | A | 6.7 | 50 | 4 | 5 | 4 | Example |
| 46 | 15 | 0 | 15 | 1 | 1 | B | 6.7 | 50 | 4 | ≧30 | 4 | Invention |

TABLE 7-continued

| | Sample specifications | | | | | | | | Performance evaluation results | | | |
|---|---|---|---|---|---|---|---|---|---|---|---|---|
| No | $CrO_3$ (g/l) | Chromium reducibility (%) | $H_3PO_4$ (g/l) | $H_3PO_4/Cr^{(VI)}O_3$ | $H_3PO_4/CrO_3$ | Resin type | Resin/Cr $CrO_3$ | Cr coating weight (mg/m$^2$) | Color tone (YI value) | Bath stability (days) | Corrosion resistance | Remark |
| 47 | 15 | 10 | 15 | 1.1 | 1 | B | 6.7 | 50 | 4 | ≧30 | 4 | Example |
| 48 | 15 | 20 | 15 | 1.3 | 1 | B | 6.7 | 50 | 4 | ≧30 | 4 | |
| 49 | 15 | 30 | 15 | 1.4 | 1 | B | 6.7 | 50 | 4 | ≧30 | 4 | |
| 50 | 15 | 40 | 15 | 1.7 | 1 | B | 6.7 | 50 | 4 | ≧30 | 4 | |
| 51 | 15 | 50 | 15 | 2 | 1 | B | 6.7 | 50 | 4 | ≧30 | 4 | |
| 52 | 15 | 60 | 15 | 2.5 | 1 | B | 6.7 | 50 | 4 | 28 | 4 | |
| 53 | 15 | 70 | 15 | 3.3 | 1 | B | 6.7 | 50 | 3 | 25 | 3 | |
| 54 | 15 | 80 | 15 | 1 | 1 | B | 6.7 | 50 | 3 | 5 | 3 | Comparative Example |

Resin A: Unemulsified type acrylic emulsion
Resin B: Water-soluble acrylic resin

Example 6

Cold-rolled sheets of 0.8 mm thickness were first prepared and then subjected to hot-dip galvanizing for 3 seconds in 450–650° C. Zn—Mg—Al—Si alloy coating baths, differing in the amounts of Mg, Al and Si in the baths, and then adjusted to a coating having a coating weight of 135 g/m$^2$ by $N_2$ wiping. The coating layer compositions of the obtained Zn coated steel sheets are shown in Table 8. Cross-sections of the coated steel sheet were viewed with an SEM. The observed coating layer metallic structures are also indicated in Table 8.

Each coated steel sheet produced in the foregoing manner was cut to 150×70 mm and the corrosion loss in weight after 30 cycles of CCT was examined. One cycle of CCT consisted of SST 6 hr→drying 4 hr→damping 4 hr→freezing 4 hr. A rating of 60 g/m$^2$ or less was defined as passing. The evaluation results are shown in Table 8. Those among the present invention materials in which $Mg_2Si$ phase was observed were particularly low in corrosion loss in weight and exhibited good corrosion resistance.

TABLE 8

| Composition of hot-dip galvanizing layer (wt %) | | | | Si | $Mg_2Si$ | Ternary | Al | Zn | $MgZn_2$ | Corrosion loss in weight |
|---|---|---|---|---|---|---|---|---|---|---|
| No | Mg | Al | Si | phase | phase | crystal | phase | phase | phase | (g/m$^2$) |
| 1 | 1 | 19 | 0.6 | ○ | | ○ | ○ | | | 45 |
| 2 | 3 | 5 | 0.15 | | ○ | ○ | ○ | ○ | | 20 |
| 3 | 4 | 8 | 0.25 | | ○ | ○ | ○ | ○ | ○ | 8 |
| 4 | 5 | 10 | 0.3 | | ○ | ○ | ○ | ○ | ○ | 4 |
| 5 | 5 | 15 | 0.45 | | ○ | ○ | ○ | | ○ | 2 |
| 6 | 5 | 15 | 1.5 | | ○ | ○ | ○ | | ○ | 1 |
| 7 | 6 | 2 | 0.06 | ○ | | ○ | | ○ | ○ | 50 |
| 8 | 6 | 4 | 0.12 | | ○ | ○ | | ○ | ○ | 16 |
| 9 | 10 | 2 | 0.06 | ○ | | ○ | | ○ | ○ | 55 |
| 10 | 10 | 10 | 0.3 | | ○ | ○ | ○ | | ○ | 3 |
| 11 | 3 | 6 | 0.1 | | ○ | ○ | ○ | ○ | | 18 |

Example 7

Cold-rolled sheets of 0.8 mm thickness were prepared and subjected to hot-dip galvanizing by immersion for 3 seconds in 500–650° C. Zn—Mg—Al—Si alloy coating baths, differing in the amounts of added elements in the baths, and then adjusted to a coating having a coating weight of 135 g/m$^2$ by $N_2$ wiping.

The compositions of the coating layers of the obtained Zn coated steel sheets are shown in Tables 9–11. Some of the samples were provided with Ni coating layers as underlying layers.

After production in the foregoing manner, the bend and end faces of each coated steel sheet cut to 150×70 mm and bent 180 degrees were evaluated after 40 cycles of CCT for red rust occurrence condition in accordance with the criteria shown below. A rating of 3 or higher was defined as passing.

One cycle of CCT consisted of SST 6 hr→drying 4 hr→damping 4 hr and freezing 4 hr.

Red rust occurrence condition (Rating): (Red rust area ratio)

5: Less than 5%

4: 5% to less than 10%

3: 10% to less than 20%

2: 20% to less than 30%

1: 30% or greater

The results of the evaluation are shown in Tables 12–14. The present invention materials all exhibited excellent corrosion resistance.

TABLE 9

| No. | Ni pre-coating (g/m²) | Composition of hot-dip galvanizing layer (wt %) Mg | Al | Si | In | Bi | Sn | Remark |
|---|---|---|---|---|---|---|---|---|
| 1 | None | 2 | 2 | 0.06 | 0.5 | | | Invention Example |
| 2 | None | 2 | 2 | 0.06 | | 0.5 | | Invention Example |
| 3 | None | 2 | 2 | 0.06 | | | 5 | Invention Example |
| 4 | None | 2 | 2 | 0.06 | 0.5 | 0.5 | | Invention Example |
| 5 | None | 2 | 2 | 0.06 | 0.5 | | 5 | Invention Example |
| 6 | None | 2 | 2 | 0.06 | | 0.5 | 5 | Invention Example |
| 7 | None | 2 | 2 | 0.06 | 0.5 | 0.5 | 5 | Invention Example |
| 8 | None | 2 | 19 | 0.6 | 0.5 | | | Invention Example |
| 9 | None | 2 | 19 | 0.6 | | 0.5 | | Invention Example |
| 10 | None | 2 | 19 | 0.6 | | | 5 | Invention Example |
| 11 | None | 2 | 19 | 0.6 | 0.5 | 0.5 | | Invention Example |
| 12 | None | 2 | 19 | 0.6 | 0.5 | | 5 | Invention Example |
| 13 | None | 2 | 19 | 0.6 | | 0.5 | 5 | Invention Example |
| 14 | None | 2 | 19 | 0.6 | 0.5 | 0.5 | 5 | Invention Example |
| 15 | None | 5 | 10 | 0.3 | 0.5 | | | Invention Example |
| 16 | None | 5 | 10 | 0.3 | | 0.5 | | Invention Example |
| 17 | None | 5 | 10 | 0.3 | | | 5 | Invention Example |
| 18 | None | 5 | 10 | 0.3 | 0.5 | 0.5 | | Invention Example |
| 19 | None | 5 | 10 | 0.3 | 0.5 | | 5 | Invention Example |
| 20 | None | 5 | 10 | 0.3 | | 0.5 | 5 | Invention Example |
| 21 | None | 5 | 10 | 0.3 | 0.5 | 0.5 | 5 | Invention Example |
| 22 | None | 5 | 15 | 1.5 | 0.5 | | | Invention Example |
| 23 | None | 5 | 15 | 1.5 | | 0.5 | | Invention Example |
| 24 | None | 5 | 15 | 1.5 | | | 5 | Invention Example |
| 25 | None | 5 | 15 | 1.5 | 0.5 | 0.5 | | Invention Example |
| 26 | None | 5 | 15 | 1.5 | 0.5 | | 5 | Invention Example |
| 27 | None | 5 | 15 | 1.5 | | 0.5 | 5 | Invention Example |
| 28 | None | 5 | 15 | 1.5 | 0.5 | 0.5 | 5 | Invention Example |
| 29 | None | 10 | 4 | 0.06 | 0.5 | | | Invention Example |
| 30 | None | 10 | 4 | 0.06 | | 0.5 | | Invention Example |
| 31 | None | 10 | 4 | 0.06 | | | 5 | Invention Example |
| 32 | None | 10 | 4 | 0.06 | 0.5 | 0.5 | | Invention Example |
| 33 | None | 10 | 4 | 0.06 | 0.5 | | 5 | Invention Example |
| 34 | None | 10 | 4 | 0.06 | | 0.5 | 5 | Invention Example |
| 35 | None | 10 | 4 | 0.06 | 0.5 | 0.5 | 5 | Invention Example |
| 36 | None | 10 | 10 | 0.3 | 0.5 | | | Invention Example |
| 37 | None | 10 | 10 | 0.3 | | 0.5 | | Invention Example |
| 38 | None | 10 | 10 | 0.3 | | | 5 | Invention Example |
| 39 | None | 10 | 10 | 0.3 | 0.5 | 0.5 | | Invention Example |
| 40 | None | 10 | 10 | 0.3 | 0.5 | | 5 | Invention Example |
| 41 | None | 10 | 10 | 0.3 | | 0.5 | 5 | Invention Example |
| 42 | None | 10 | 10 | 0.3 | 0.5 | 0.5 | 5 | Invention Example |
| 43 | None | 0 | 0.2 | 0 | 0.5 | 0.5 | 5 | Comparative Example |
| 44 | None | 1 | 20 | 0.6 | 0.5 | 0.5 | 5 | Comparative Example |
| 45 | None | 5 | 20 | 0.6 | 0.5 | 0.5 | 5 | Comparative Example |
| 46 | None | 12 | 1 | 0.03 | 0.5 | 0.5 | 5 | Comparative Example |
| 47 | None | 12 | 15 | 0.45 | 0.5 | 0.5 | 5 | Comparative Example |
| 48 | None | 5 | 15 | 0 | 0.5 | 0.5 | 5 | Comparative Example |
| 49 | None | 5 | 15 | 3 | 0.5 | 0.5 | 5 | Comparative Example |

TABLE 10

| No. | Ni pre-coating (g/m²) | Composition of hot-dip galvanizing layer (wt %) Mg | Al | Si | In | Bi | Sn | Remark |
|---|---|---|---|---|---|---|---|---|
| 50 | None | 3 | 5 | 0.15 | 0.015 | | | Invention Example |
| 51 | None | 3 | 5 | 0.15 | 0.05 | | | Invention Example |
| 52 | None | 3 | 5 | 0.15 | 0.2 | | | Invention Example |
| 53 | None | 3 | 5 | 0.15 | 0.8 | | | Invention Example |
| 54 | None | 3 | 5 | 0.15 | 1 | | | Invention Example |
| 55 | None | 3 | 5 | 0.15 | | 0.015 | | Invention Example |
| 56 | None | 3 | 5 | 0.15 | | 0.05 | | Invention Example |
| 57 | None | 3 | 5 | 0.15 | | 0.2 | | Invention Example |
| 58 | None | 3 | 5 | 0.15 | | 0.8 | | Invention Example |
| 59 | None | 3 | 5 | 0.15 | | 1 | | Invention Example |
| 60 | None | 3 | 5 | 0.15 | | | 1 | Invention Example |
| 61 | None | 3 | 5 | 0.15 | | | 3 | Invention Example |
| 62 | None | 3 | 5 | 0.15 | | | 5 | Invention Example |
| 63 | None | 3 | 5 | 0.15 | | | 10 | Invention Example |

TABLE 10-continued

| No. | Ni pre-coating (g/m²) | Composition of hot-dip galvanizing layer (wt %) Mg | Al | Si | In | Bi | Sn | Remark |
|---|---|---|---|---|---|---|---|---|
| 64 | None | 3 | 5 | 0.15 | 0.02 | 0.015 | | Invention Example |
| 65 | None | 3 | 5 | 0.15 | 0.02 | 0.05 | | Invention Example |
| 66 | None | 3 | 5 | 0.15 | 0.02 | 0.2 | | Invention Example |
| 67 | None | 3 | 5 | 0.15 | 0.02 | 0.8 | | Invention Example |
| 68 | None | 3 | 5 | 0.15 | 0.02 | 1 | | Invention Example |
| 69 | None | 3 | 5 | 0.15 | 0.02 | 0.02 | 1 | Invention Example |
| 70 | None | 3 | 5 | 0.15 | 0.02 | 0.02 | 3 | Invention Example |
| 71 | None | 3 | 5 | 0.15 | 0.02 | 0.02 | 5 | Invention Example |
| 72 | None | 3 | 5 | 0.15 | 0.02 | 0.02 | 10 | Invention Example |
| 73 | None | 3 | 5 | 0.15 | 0.05 | 0.02 | | Invention Example |
| 74 | None | 3 | 5 | 0.15 | 0.2 | 0.02 | | Invention Example |
| 75 | None | 3 | 5 | 0.15 | 0.8 | 0.02 | | Invention Example |
| 76 | None | 3 | 5 | 0.15 | 1 | 0.02 | | Invention Example |
| 77 | None | 3 | 5 | 0.15 | 0.02 | | 1 | Invention Example |
| 78 | None | 3 | 5 | 0.15 | 0.02 | | 3 | Invention Example |
| 79 | None | 3 | 5 | 0.15 | 0.02 | | 5 | Invention Example |
| 80 | None | 3 | 5 | 0.15 | 0.02 | | 10 | Invention Example |
| 81 | None | 3 | 5 | 0.15 | | 0.02 | 1 | Invention Example |
| 82 | None | 3 | 5 | 0.15 | | 0.02 | 3 | Invention Example |
| 83 | None | 3 | 5 | 0.15 | | 0.02 | 5 | Invention Example |
| 84 | None | 3 | 5 | 0.15 | | 0.02 | 10 | Invention Example |
| 85 | None | 3 | 5 | 0.15 | 0.05 | | 1 | Invention Example |
| 86 | None | 3 | 5 | 0.15 | 0.2 | | 1 | Invention Example |
| 87 | None | 3 | 5 | 0.15 | 0.8 | | 1 | Invention Example |
| 88 | None | 3 | 5 | 0.15 | 1 | | 1 | InventionExample |
| 89 | None | 3 | 5 | 0.15 | | 0.05 | 1 | Invention Example |
| 90 | None | 3 | 5 | 0.15 | | 0.2 | 1 | Invention Example |
| 91 | None | 3 | 5 | 0.15 | | 0.8 | 1 | Invention Example |
| 92 | None | 3 | 5 | 0.15 | | 1 | 1 | Invention Example |
| 93 | None | 3 | 5 | 0.15 | 0.02 | 0.05 | 1 | Invention Example |
| 94 | None | 3 | 5 | 0.15 | 0.02 | 0.2 | 1 | Invention Example |
| 95 | None | 3 | 5 | 0.15 | 0.02 | 0.8 | 1 | Invention Example |

TABLE 11

| No. | Ni pre-coating (g/m²) | Composition of hot-dip galvanizing layer (wt %) Mg | Al | Si | In | Bi | Sn | Remark |
|---|---|---|---|---|---|---|---|---|
| 96 | None | 3 | 5 | 0.15 | 0.02 | 1 | 1 | Invention Example |
| 97 | None | 3 | 5 | 0.15 | 0.05 | 0.02 | 1 | Invention Example |
| 98 | None | 3 | 5 | 0.15 | 0.2 | 0.02 | 1 | Invention Example |
| 99 | None | 3 | 5 | 0.15 | 0.8 | 0.02 | 1 | Invention Example |
| 100 | None | 3 | 5 | 0.15 | 1 | 0.02 | 1 | Invention Example |
| 101 | None | 3 | 5 | 0.15 | 0.5 | 0.05 | | Invention Example |
| 102 | None | 3 | 5 | 0.15 | 0.5 | 0.2 | | Invention Example |
| 103 | None | 3 | 5 | 0.15 | 0.5 | 0.8 | | Invention Example |
| 104 | None | 3 | 5 | 0.15 | 0.5 | 1 | | Invention Example |
| 105 | None | 3 | 5 | 0.15 | 0.5 | 0.5 | 1 | Invention Example |
| 106 | None | 3 | 5 | 0.15 | 0.5 | 0.5 | 3 | Invention Example |
| 107 | None | 3 | 5 | 0.15 | 0.5 | 0.5 | 5 | Invention Example |
| 108 | None | 3 | 5 | 0.15 | 0.5 | 0.5 | 10 | Invention Example |
| 109 | None | 3 | 5 | 0.15 | 0.05 | 0.5 | | Invention Example |
| 110 | None | 3 | 5 | 0.15 | 0.2 | 0.5 | | Invention Exam le |
| 111 | None | 3 | 5 | 0.15 | 0.8 | 0.5 | | Invention Example |
| 112 | None | 3 | 5 | 0.15 | 1 | 0.5 | | Invention Example |
| 113 | None | 3 | 5 | 0.15 | 0.5 | | 1 | Invention Example |
| 114 | None | 3 | 5 | 0.15 | 0.5 | | 3 | Invention Example |
| 115 | None | 3 | 5 | 0.15 | 0.5 | | 5 | Invention Example |
| 116 | None | 3 | 5 | 0.15 | 0.5 | | 10 | Invention Example |
| 117 | None | 3 | 5 | 0.15 | | 0.5 | 1 | Invention Exam le |
| 118 | None | 3 | 5 | 0.15 | | 0.5 | 3 | Invention Exam le |
| 119 | None | 3 | 5 | 0.15 | | 0.5 | 5 | Invention Example |
| 120 | None | 3 | 5 | 0.15 | | 0.5 | 10 | Invention Example |
| 121 | None | 3 | 5 | 0.15 | 0.05 | | 5 | Invention Example |
| 122 | None | 3 | 5 | 0.15 | 0.2 | | 5 | Invention Example |
| 123 | None | 3 | 5 | 0.15 | 0.8 | | 5 | Invention Example |
| 124 | None | 3 | 5 | 0.15 | 1 | | 5 | Invention Example |
| 125 | None | 3 | 5 | 0.15 | | 0.05 | 5 | Invention Example |
| 126 | None | 3 | 5 | 0.15 | | 0.2 | 5 | Invention Example |

TABLE 11-continued

| No. | Ni pre-coating (g/m²) | Composition of hot-dip galvanizing layer (wt %) Mg | Al | Si | In | Bi | Sn | Remark |
|---|---|---|---|---|---|---|---|---|
| 127 | None | 3 | 5 | 0.15 | | 0.8 | 5 | Invention Example |
| 128 | None | 3 | 5 | 0.15 | | 1 | 5 | Invention Exam le |
| 129 | None | 3 | 5 | 0.15 | 0.5 | 0.05 | 5 | Invention Example |
| 130 | None | 3 | 5 | 0.15 | 0.5 | 0.2 | 5 | Invention Example |
| 131 | None | 3 | 5 | 0.15 | 0.5 | 0.8 | 5 | Invention Example |
| 132 | None | 3 | 5 | 0.15 | 0.5 | 1 | 5 | Invention Example |
| 133 | None | 3 | 5 | 0.15 | 0.05 | 0.5 | 5 | Invention Example |
| 134 | None | 3 | 5 | 0.15 | 0.2 | 0.5 | 5 | Invention Example |
| 135 | None | 3 | 5 | 0.15 | 0.8 | 0.5 | 5 | Invention Example |
| 136 | None | 3 | 5 | 0.15 | 1 | 0.5 | 5 | Invention Example |
| 137 | 0.5 | 3 | 5 | 0.15 | 0.02 | 0.02 | 1 | Invention Example |
| 138 | 0.5 | 3 | 5 | 0.15 | 0.5 | 0.5 | 5 | Invention Example |

TABLE 12

| | Corrosion resistance without painting | | Corrosion resistance after painting | | |
|---|---|---|---|---|---|
| No. | Bend rating | End face rating | Bend rating | End face rating | Remark |
| 1 | 3 | 3 | 3 | 3 | Invention Example |
| 2 | 3 | 3 | 3 | 3 | Invention Example |
| 3 | 3 | 3 | 3 | 3 | Invention Example |
| 4 | 3 | 4 | 3 | 3 | Invention Example |
| 5 | 3 | 4 | 3 | 3 | Invention Example |
| 6 | 3 | 4 | 3 | 3 | Invention Example |
| 7 | 3 | 4 | 3 | 4 | Invention Example |
| 8 | 3 | 4 | 4 | 3 | Invention Example |
| 9 | 3 | 4 | 4 | 3 | Invention Example |
| 10 | 3 | 4 | 4 | 3 | Invention Example |
| 11 | 3 | 4 | 4 | 3 | Invention Example |
| 12 | 3 | 4 | 4 | 3 | Invention Example |
| 13 | 3 | 4 | 4 | 3 | Invention Example |
| 14 | 4 | 5 | 4 | 4 | Invention Example |
| 15 | 4 | 4 | 4 | 4 | Invention Example |
| 16 | 4 | 4 | 4 | 4 | Invention Example |
| 17 | 4 | 4 | 4 | 4 | Invention Example |
| 18 | 4 | 4 | 4 | 4 | Invention Example |
| 19 | 4 | 4 | 4 | 4 | Invention Example |
| 20 | 4 | 4 | 4 | 4 | Invention Example |
| 21 | 4 | 5 | 4 | 5 | Invention Example |
| 22 | 4 | 4 | 4 | 4 | Invention Example |
| 23 | 4 | 4 | 4 | 4 | Invention Example |
| 24 | 4 | 4 | 4 | 4 | Invention Example |
| 25 | 4 | 4 | 4 | 4 | Invention Example |
| 26 | 4 | 4 | 4 | 4 | Invention Example |
| 27 | 4 | 4 | 4 | 4 | Invention Example |
| 28 | 4 | 5 | 4 | 5 | Invention Example |
| 29 | 4 | 4 | 4 | 4 | Invention Example |
| 30 | 4 | 4 | 4 | 4 | Invention Example |
| 31 | 4 | 4 | 4 | 4 | Invention Example |
| 32 | 4 | 4 | 4 | 4 | Invention Example |
| 33 | 4 | 4 | 4 | 4 | Invention Example |
| 34 | 4 | 4 | 4 | 4 | Invention Example |
| 35 | 4 | 5 | 4 | 5 | Invention Example |
| 36 | 4 | 4 | 4 | 4 | Invention Example |
| 37 | 4 | 4 | 4 | 4 | Invention Example |
| 38 | 4 | 4 | 4 | 4 | Invention Example |
| 39 | 4 | 4 | 4 | 4 | Invention Example |
| 40 | 4 | 4 | 4 | 4 | Invention Example |
| 41 | 4 | 4 | 4 | 4 | Invention Example |
| 42 | 4 | 5 | 4 | 5 | Invention Example |
| 43 | 1 | 1 | 1 | 1 | Comparative Example |
| 44 | 2 | 3 | 2 | 2 | Comparative Example |
| 45 | 2 | 3 | 2 | 2 | Comparative Example |
| 46 | 2 | 2 | 2 | 3 | Comparative Example |
| 47 | 2 | 3 | 2 | 2 | Comparative Example |
| 48 | 2 | 3 | 2 | 2 | Comparative Example |
| 49 | 2 | 3 | 2 | 2 | Comparative Example |

TABLE 13

| | Corrosion resistance without painting | | Corrosion resistance after painting | | |
|---|---|---|---|---|---|
| No. | Bend rating | End face rating | Bend rating | End face rating | Remark |
| 50 | 4 | 3 | 4 | 3 | Invention Example |
| 51 | 4 | 4 | 4 | 4 | Invention Example |
| 52 | 4 | 4 | 4 | 4 | Invention Example |
| 53 | 4 | 4 | 4 | 4 | Invention Example |
| 54 | 4 | 4 | 4 | 4 | Invention Example |
| 55 | 4 | 3 | 4 | 3 | Invention Example |
| 56 | 4 | 4 | 4 | 4 | Invention Example |
| 57 | 4 | 4 | 4 | 4 | Invention Example |
| 58 | 4 | 4 | 4 | 4 | Invention Example |
| 59 | 4 | 4 | 4 | 4 | Invention Example |
| 60 | 4 | 4 | 4 | 4 | Invention Example |
| 61 | 4 | 4 | 4 | 4 | Invention Example |
| 62 | 4 | 4 | 4 | 4 | Invention Example |
| 63 | 4 | 4 | 4 | 4 | Invention Example |
| 64 | 4 | 4 | 4 | 4 | Invention Example |
| 65 | 4 | 4 | 4 | 4 | Invention Example |
| 66 | 4 | 4 | 4 | 4 | Invention Example |
| 67 | 4 | 4 | 4 | 4 | Invention Example |
| 68 | 4 | 5 | 4 | 5 | Invention Example |
| 69 | 4 | 5 | 4 | 5 | Invention Example |
| 70 | 4 | 5 | 4 | 5 | Invention Example |
| 71 | 4 | 5 | 4 | 5 | Invention Example |
| 72 | 4 | 5 | 4 | 5 | Invention Example |
| 73 | 4 | 4 | 4 | 4 | Invention Example |
| 74 | 4 | 4 | 4 | 4 | Invention Example |
| 75 | 4 | 4 | 4 | 4 | Invention Example |
| 76 | 4 | 5 | 4 | 5 | Invention Example |
| 77 | 4 | 4 | 4 | 4 | Invention Example |
| 78 | 4 | 4 | 4 | 4 | Invention Example |
| 79 | 4 | 4 | 4 | 4 | Invention Example |
| 80 | 4 | 5 | 4 | 5 | Invention Example |
| 81 | 4 | 4 | 4 | 4 | Invention Example |
| 82 | 4 | 4 | 4 | 4 | Invention Example |
| 83 | 4 | 4 | 4 | 4 | Invention Example |
| 84 | 4 | 5 | 4 | 5 | Invention Example |
| 85 | 4 | 4 | 4 | 4 | Invention Example |
| 86 | 4 | 4 | 4 | 4 | Invention Example |
| 87 | 4 | 4 | 4 | 4 | Invention Example |
| 88 | 4 | 4 | 4 | 4 | Invention Example |
| 89 | 4 | 4 | 4 | 4 | Invention Example |
| 90 | 4 | 4 | 4 | 4 | Invention Example |
| 91 | 4 | 4 | 4 | 4 | Invention Example |
| 92 | 4 | 4 | 4 | 4 | Invention Example |
| 93 | 4 | 4 | 4 | 4 | Invention Example |
| 94 | 4 | 5 | 4 | 5 | Invention Example |
| 95 | 4 | 5 | 4 | 5 | Invention Example |

TABLE 14

| | Corrosion resistance without painting | | Corrosion resistance after painting | | |
|---|---|---|---|---|---|
| No. | Bend rating | End face rating | Bend rating | End face rating | Remark |
| 96 | 4 | 5 | 4 | 5 | Invention Example |
| 97 | 4 | 4 | 4 | 4 | Invention Example |
| 98 | 4 | 5 | 4 | 5 | Invention Example |
| 99 | 4 | 5 | 4 | 5 | Invention Example |
| 100 | 4 | 5 | 4 | 5 | Invention Example |
| 101 | 4 | 4 | 4 | 4 | Invention Example |
| 102 | 4 | 4 | 4 | 4 | Invention Example |
| 103 | 4 | 4 | 4 | 4 | Invention Example |
| 104 | 4 | 5 | 4 | 5 | Invention Example |
| 105 | 4 | 5 | 4 | 5 | Invention Example |
| 106 | 4 | 5 | 4 | 5 | Invention Example |
| 107 | 4 | 5 | 4 | 5 | Invention Example |
| 108 | 4 | 5 | 4 | 5 | Invention Example |
| 109 | 4 | 4 | 4 | 4 | Invention Example |
| 110 | 4 | 4 | 4 | 4 | Invention Example |

TABLE 14-continued

| | Corrosion resistance without painting | | Corrosion resistance after painting | | |
|---|---|---|---|---|---|
| No. | Bend rating | End face rating | Bend rating | End face rating | Remark |
| 111 | 4 | 4 | 4 | 4 | Invention Example |
| 112 | 4 | 5 | 4 | 5 | Invention Example |
| 113 | 4 | 4 | 4 | 4 | Invention Example |
| 114 | 4 | 4 | 4 | 4 | Invention Example |
| 115 | 4 | 4 | 4 | 4 | Invention Example |
| 116 | 4 | 5 | 4 | 5 | Invention Example |
| 117 | 4 | 5 | 4 | 5 | Invention Example |
| 118 | 4 | 4 | 4 | 4 | Invention Example |
| 119 | 4 | 4 | 4 | 4 | Invention Example |
| 120 | 4 | 5 | 4 | 5 | Invention Example |
| 121 | 4 | 4 | 4 | 4 | Invention Example |
| 122 | 4 | 4 | 4 | 4 | Invention Example |
| 123 | 4 | 4 | 4 | 4 | Invention Example |
| 124 | 4 | 5 | 4 | 5 | Invention Example |
| 125 | 4 | 4 | 4 | 4 | Invention Example |
| 126 | 4 | 4 | 4 | 4 | Invention Example |
| 127 | 4 | 4 | 4 | 4 | Invention Example |
| 128 | 4 | 5 | 4 | 5 | Invention Example |
| 129 | 4 | 5 | 4 | 5 | Invention Example |
| 130 | 4 | 5 | 4 | 5 | Invention Example |
| 131 | 4 | 5 | 4 | 5 | Invention Example |
| 132 | 4 | 5 | 4 | 5 | Invention Example |
| 133 | 4 | 5 | 4 | 5 | Invention Example |
| 134 | 4 | 5 | 4 | 5 | Invention Example |
| 135 | 4 | 5 | 4 | 5 | Invention Example |
| 136 | 4 | 5 | 4 | 5 | Invention Example |
| 137 | 5 | 5 | 5 | 5 | Invention Example |
| 138 | 5 | 5 | 5 | 5 | Invention Example |

Example 8

Cold-rolled sheets of 0.8 mm thickness were prepared and subjected to hot-dip galvanizing by immersion for 3 seconds in 500–650° C. Zn—Mg—Al—Si alloy coating baths differing in the amounts of added elements in the baths and then adjusted to a coating having a coating weight of 135 g/m$^2$ by $N_2$ wiping.

The compositions of the coating layers of the obtained Zn coated steel sheets are shown in Tables 9–11. Some of the samples were provided with Ni coating layers as underlying layers.

The Zn—Mg—Al—Si alloy coated steel sheets were then immersed in a coating-type chromate treatment solution to conduct chromate treatment. The coating weight of the chromate film was made 50 mg/m$^2$ as Cr.

An epoxy-polyester paint was applied on the chromate film as primer with a bar coater and baked in a hot-air drying furnace to adjust the thickness to 5 $\mu$m. As a top coat, polyester paint was applied with a bar coater and baked in a hot-air drying furnace to adjust the thickness to 20 $\mu$m.

After production in the foregoing manner, the bend of each painted steel sheet cut to 150×70 mm and bent 180 degrees was evaluated after 40 cycles of CCT for red rust occurrence condition and the end faces thereof for swelling occurrence condition in accordance with the criteria shown below. A rating of 3 or higher was defined as passing.

One cycle of CCT consisted of SST 6 hr→drying 4 hr→damping 4 hr→freezing 4 hr.

Red rust occurrence condition
(Rating): (Red rust area ratio)

5: Less than 5%

4: 5% to less than 10%

3: 10% to less than 20%

2: 20% to less than 30%

1: 30% or greater

Swelling occurrence conditions
(Rating): (End face swelling length)

5: Less than 1 mm

4: 1 mm to less than 3 mm

3: 3 mm to less than 5 mm

2: 5 mm to less than 10 mm

1: 10 mm or greater

The results of the evaluations are shown in Tables 12–14. The present invention materials all exhibited excellent corrosion resistance.

Example 9

Cold-rolled sheet of 0.8 mm thickness was prepared and subjected to hot-dip galvanizing by immersion for 3 seconds in a 600° C. Zn-system composite coating bath and then adjusted to a coating having a coating weight of 135 g/m$^2$ by $N_2$ wiping. A Ni coating layer was provided as an underlying layer.

The coating layer composition of the obtained coated steel sheet comprised, in percentage by weight, 3% of Mg, 5% of Al, 0.1% of Si, 0.2% of In, 0.2% of Bi, and 2% of Sn.

The Zn-system composite coated steel sheet was then immersed in a coating-type chromate treatment solution to conduct chromate treatment. The coating weight of the chromate film was made 50 mg/m$^2$ as Cr.

Epoxy-polyester paint, polyester paint, melamine-polyester paint, urethane-polyester paint or acrylic paint was applied with a bar coater and baked in a hot-air drying furnace to adjust the thickness as shown in Table 15.

TABLE 15

| | | | | Corrosion resistance after painting | | |
|---|---|---|---|---|---|---|
| No. | Painting type | Thickness ($\mu$m) | Coating type | Bend rating | End face rating | Remark |
| 1 | Polyester paint | 20 | Hot-dip galvanizing | 2 | 1 | Comparative Example |
| 2 | " | 100 | " | 1 | 1 | " |
| 3 | " | 5 | Zn—Mg—Al—Si alloy coating | 4 | 3 | Invention Example |
| 4 | " | 10 | " | 5 | 4 | " |
| 5 | " | 20 | " | 5 | 5 | " |
| 6 | " | 50 | " | 5 | 5 | " |
| 7 | " | 100 | " | 4 | 5 | " |
| 8 | Epoxy-polyester paint | 20 | Hot-dip galvanizing | 2 | 1 | Comparative Example |
| 9 | " | 100 | " | 1 | 1 | " |

TABLE 15-continued

| No. | Painting type | Thickness (μm) | Coating type | Corrosion resistance after painting: Bend rating | End face rating | Remark |
|---|---|---|---|---|---|---|
| 10 | " | 5 | Zn—Mg—Al—Si alloy coating | 4 | 3 | Invention Example |
| 11 | " | 10 | " | 5 | 4 | " |
| 12 | " | 20 | " | 5 | 5 | " |
| 13 | " | 50 | " | 5 | 5 | " |
| 14 | " | 100 | " | 4 | 5 | " |
| 15 | Melamine-polyester paint | 20 | Hot-dip galvanizing | 2 | 1 | Comparative Example |
| 16 | " | 100 | " | 1 | 1 | " |
| 17 | " | 5 | Zn—Mg—Al—Si alloy coating | 4 | 3 | Invention Example |
| 18 | " | 10 | " | 5 | 4 | " |
| 19 | " | 20 | " | 5 | 5 | " |
| 20 | " | 50 | " | 5 | 5 | " |
| 21 | " | 100 | " | 4 | 5 | " |
| 22 | Urethane-polyester paint | 20 | Hot-dip galvanizing | 2 | 1 | Comparative Example |
| 23 | " | 100 | " | 1 | 1 | " |
| 24 | " | 5 | Zn—Mg—Al—Si alloy coating | 4 | 3 | Invention Example |
| 25 | Urethane-polyester paint | 10 | " | 5 | 4 | " |
| 26 | " | 20 | " | 5 | 5 | " |
| 27 | " | 50 | " | 5 | 5 | " |
| 28 | " | 100 | " | 4 | 5 | " |
| 29 | Acrylic paint | 20 | Hot-dip galvanizing | 2 | 1 | Comparative Example |
| 30 | " | 100 | " | 1 | 1 | " |
| 31 | " | 5 | Zn—Mg—Al—Si alloy coating | 4 | 3 | Invention Example |
| 32 | " | 10 | " | 5 | 4 | " |
| 33 | " | 20 | " | 5 | 5 | " |
| 34 | " | 50 | " | 5 | 5 | " |
| 35 | " | 100 | " | 4 | 5 | " |
| 36 | Epoxy-polyester paint + Polyester paint | 5 + 10 | Zn—Mg—Al—Si alloy coating | 5 | 5 | Invention Example |

Similarly coated hot-dip galvanized steel sheets were used as comparative examples.

After production in the foregoing manner, the bend of each coated steel sheet cut to 150×70 mm and bent 180 degrees was evaluated after 40 cycles of CCT for red rust occurrence condition and the end faces thereof for swelling occurrence condition in accordance with the criteria shown below. A rating of 3 or higher was defined as passing.

One cycle of CCT consisted of SST 6 hr→drying 4 hr→damping 4 hr→freezing 4 hr.

Red rust occurrence condition (Rating): (Red rust area ratio)

5: Less than 5%

4: 5% to less than 10%

3: 10% to less than 20%

2: 20% to less than 30%

1: 30% or greater

Swelling occurrence conditions (Rating): (End face swelling length)

5: Less than 1 mm

4: 1 mm to less than 3 mm

3: 3 mm to less than 5 mm

2: 5 mm to less than 10 mm

1: 10 mm or greater

The results of the evaluations are shown in Table 15. The present invention materials all exhibited excellent corrosion resistance.

Example 10

Cold-rolled sheets of 0.8 mm thickness were prepared and subjected to hot-dip galvanizing for 3 seconds in 400–500° C. Zn—Mg—Al—Si alloy coating baths differing in amounts of impurity elements in the baths and then adjusted to a coating having a coating weight of 135 g/$m^2$ by $N_2$ wiping. The coating layer compositions of the obtained Zn coated steel sheets are shown in Table 16.

The Zn—Mg—Al—Si alloy coated steel sheets were then immersed in a coating-type chromate treatment solution to conduct chromate treatment. The coating weight of the chromate film was made 50 mg/$m^2$ as Cr.

An epoxy-polyester paint was applied on the chromate film as primer with a bar coater and baked in a hot-air drying furnace to adjust the thickness to 5 μm. As a top coat, polyester paint was applied with a bar coater and baked in a hot-air drying furnace to adjust the thickness to 20 μm.

Each painted steel sheet produced in the foregoing manner was cut to 150×70 mm and was pushed out 7 mm using an Erichsen tester conforming to JIS B-7729, whereafter the plating adherence was examined by conducting a taping test following deformation. The evaluation results (plating flaking property) are shown in Table 16. The present invention materials all exhibited excellent plating adherence.

TABLE 16

| No. | Composition of hot-dip Zn—Mg—Al—Si alloy coating layer (wt %) Mg | Al | Si | Ca | Be | Ti | Cu | Ni | Co | Cr | Mn | Fe | Pb | Sb | Sr | Flaking of coating | Remark |
|---|---|---|---|---|---|---|---|---|---|---|---|---|---|---|---|---|---|
| 1 | 3 | 5 | 0.15 | 0.001> | 0.001> | 0.001> | 0.001> | 0.03 | 0.001> | 0.001> | 0.001> | 0.03 | 0.05 | 0.001> | — | Flake | Invention Example |
| 2 | 3 | 5 | 0.15 | 0.001> | 0.001> | 0.001> | 0.001> | 0.03 | 0.001> | 0.001> | 0.001> | 0.03 | 0.09 | 0.001> | — | Flake | |
| 3 | 3 | 5 | 0.15 | 0.001> | 0.001> | 0.001> | 0.001> | 0.03 | 0.001> | 0.001> | 0.001> | 0.03 | 0.02 | 0.01 | — | Flake | |
| 4 | 3 | 5 | 0.15 | 0.001> | 0.001> | 0.001> | 0.001> | 0.03 | 0.001> | 0.001> | 0.001> | 0.03 | 0.001> | 0.05 | — | Flake | |
| 5 | 3 | 5 | 0.15 | 0.001> | 0.001> | 0.001> | 0.001> | 0.03 | 0.001> | 0.001> | 0.001> | 0.03 | 0.001> | 0.05 | — | Flake | |
| 6 | 3 | 5 | 0.15 | 0.001> | 0.001> | 0.001> | 0.001> | 0.03 | 0.001> | 0.001> | 0.001> | 0.03 | 0.001> | 0.001> | — | Flake | |
| 7 | 3 | 5 | 0.15 | 0.05 | 0.001> | 0.001> | 0.001> | 0.001> | 0.001> | 0.001> | 0.001> | 0.03 | 0.05 | 0.001> | — | Flake | |
| 8 | 3 | 5 | 0.15 | 0.001> | 0.03 | 0.001> | 0.001> | 0.001> | 0.001> | 0.001> | 0.001> | 0.03 | 0.05 | 0.001> | — | Flake | |
| 9 | 3 | 5 | 0.15 | 0.001> | 0.001> | 0.03 | 0.001> | 0.001> | 0.001> | 0.001> | 0.001> | 0.03 | 0.05 | 0.001> | — | Flake | |
| 10 | 3 | 5 | 0.15 | 0.001> | 0.001> | 0.001> | 0.31 | 0.001> | 0.001> | 0.001> | 0.001> | 0.03 | 0.05 | 0.001> | — | Flake | |
| 11 | 3 | 5 | 0.15 | 0.001> | 0.001> | 0.001> | 0.001> | 0.001> | 0.04 | 0.001> | 0.001> | 0.03 | 0.05 | 0.001> | — | Flake | |
| 12 | 3 | 5 | 0.15 | 0.001> | 0.001> | 0.001> | 0.001> | 0.001> | 0.001> | 0.03 | 0.001> | 0.03 | 0.05 | 0.001> | — | Flake | |
| 13 | 3 | 5 | 0.15 | 0.001> | 0.001> | 0.001> | 0.001> | 0.001> | 0.001> | 0.001> | 0.03 | 0.03 | 0.05 | 0.001> | — | Flake | |
| 14 | 3 | 10 | 0.3 | 0.001> | 0.001> | 0.001> | 0.001> | 0.001> | 0.001> | 0.001> | 0.03 | 0.03 | 0.05 | 0.001> | 0.1 | Flake | |
| 15 | 3 | 5 | 0.15 | 0.001> | 0.001> | 0.001> | 0.001> | 0.03 | 0.001> | 0.001> | 0.001> | 0.05 | 0.16 | 0.001> | | None | Comparative Example |
| 16 | 3 | 5 | 0.15 | 0.05 | 0.001> | 0.001> | 0.001> | 0.001> | 0.001> | 0.001> | 0.001> | 0.05 | 0.16 | 0.001> | | None | |
| 17 | 3 | 5 | 0.15 | 0.001> | 0.03 | 0.001> | 0.001> | 0.001> | 0.001> | 0.001> | 0.001> | 0.05 | 0.16 | 0.001> | | None | |
| 18 | 3 | s | 0.15 | 0.001> | 0.001> | 0.03 | 0.001> | 0.001> | 0.001> | 0.001> | 0.001> | 0.05 | 0.16 | 0.001> | | None | |
| 19 | 3 | 5 | 0.15 | 0.001> | 0.001> | 0.001> | 0.31 | 0.001> | 0.001> | 0.001> | 0.001> | 0.05 | 0.16 | 0.001> | | None | |
| 20 | 3 | 5 | 0.15 | 0.001> | 0.001> | 0.001> | 0.001> | 0.001> | 0.04 | 0.001> | 0.001> | 0.05 | 0.16 | 0.001> | | None | |
| 21 | 3 | 5 | 0.15 | 0.001> | 0.001> | 0.001> | 0.001> | 0.001> | 0.001> | 0.03 | 0.001> | 0.05 | 0.16 | 0.001> | | None | |
| 22 | 3 | 5 | 0.15 | 0.001> | 0.001> | 0.001> | 0.001> | 0.001> | 0.001> | 0.001> | 0.03 | 0.05 | 0.16 | 0.001> | | None | |
| 23 | 3 | 5 | 0.15 | 0.001> | 0.001> | 0.001> | 0.001> | 0.03 | 0.001> | 0.001> | 0.001> | 0.05 | 0.16 | 0.001> | | None | |
| 24 | 3 | 5 | 0.15 | 0.001> | 0.001> | 0.001> | 0.001> | 0.03 | 0.001> | 0.001> | 0.001> | 0.05 | 0.05 | 0.12 | | None | |
| 25 | 12 | 5 | 0.15 | 0.001> | 0.001> | 0.001> | 0.001> | 0.03 | 0.001> | 0.001> | 0.001> | 0.05 | 0.05 | 0.001> | | None | |
| 26 | 3 | 1 | 0.03 | 0.001> | 0.001> | 0.001> | 0.001> | 0.03 | 0.001> | 0.001> | 0.001> | 0.05 | 0.05 | 0.001> | | None | |
| 27 | 3 | 5 | 0.005 | 0.001> | 0.001> | 0.001> | 0.001> | 0.03 | 0.001> | 0.001> | 0.001> | 0.05 | 0.05 | 0.001> | | None | |
| 29 | 0 | 0.2 | 0 | 0.001> | 0.001> | 0.001> | 0.001> | 0.001> | 0.001> | 0.001> | 0.001> | 0.05 | 0.05 | 0.001> | | None | |

Example 11

Cold-rolled sheets of 0.8 mm thickness were prepared and subjected to hot-dip galvanizing for 3 seconds in 450° C. Zn-alloy coating baths and then adjusted to a coating having a coating weight of 135 g/m$^2$ by $N_2$ wiping. The coating layer compositions of the obtained Zn coated steel sheets are shown in Tables 19 and Table 20.

The Zn—Mg—Al—Si alloy coated steel sheets were then immersed in a coating-type chromate treatment solution to conduct chromate treatment. The coating weight of the chromate film was made 50 mg/m$^2$ as Cr.

Epoxy-polyester paint, polyester paint, melamine-polyester paint, urethane-polyester paint and acrylic paint were individually applied with a bar coater and baked in a hot-air drying furnace to adjust the thickness as shown in Table 17 and Table 18.

Each painted steel sheet produced in the foregoing manner was cut to 150×70 mm, scratched from the top of the coating as far as the base metal, subjected to a brine spray test in accordance with JIS Z-2371 for 20 days, and subjected to a taping test, whereafter the peeling width of the coating at the scratch was examined. The evaluation results are shown in Table 17 and Table 18. All of the present invention materials exhibited a small coat peeling width of not greater than 4 mm.

TABLE 17

| No. | Painting type | Thickness (μm) | Composition of hot-dip Zn—Mg—Al—Si alloy coating layer (wt %) Mg | Al | Si | Ca | Be | Ti | Cu | Ni | Co |
|---|---|---|---|---|---|---|---|---|---|---|---|
| 1 | Epoxy- | 5 + 20 | 3 | 5 | 0.15 | 0.05 | 0.001> | 0.001> | 0.001> | 0.001> | 0.001> |
| 2 | polyester | " | 3 | 5 | 0.15 | 0.001> | 0.03 | 0.001> | 0.001> | 0.001> | 0.001> |
| 3 | paint + | " | 3 | 5 | 0.15 | 0.001> | 0.001> | 0.03 | 0.001> | 0.001> | 0.001> |
| 4 | Polyester | " | 3 | 5 | 0.15 | 0.001> | 0.001> | 0.001> | 0.31 | 0.001> | 0.001> |
| 5 | paint | " | 3 | 5 | 0.15 | 0.001> | 0.001> | 0.001> | 0.001> | 0.02 | 0.001> |
| 6 | | " | 3 | 5 | 0.15 | 0.001> | 0.001> | 0.001> | 0.001> | 0.001> | 0.04 |
| 7 | | " | 3 | 5 | 0.15 | 0.001> | 0.001> | 0.001> | 0.001> | 0.001> | 0.001> |
| 8 | | " | 3 | 5 | 0.15 | 0.001> | 0.001> | 0.001> | 0.001> | 0.001> | 0.001> |
| 9 | | 5 + 95 | 3 | 5 | 0.15 | 0.001> | 0.001> | 0.001> | 0.001> | 0.02 | 0.001> |
| 10 | | 5 + 5 | 3 | 5 | 0.15 | 0.001> | 0.001> | 0.001> | 0.001> | 0.02 | 0.001> |
| 11 | | 5 + 10 | 3 | 5 | 0.15 | 0.001> | 0.001> | 0.001> | 0.001> | 0.02 | 0.001> |
| 12 | | 5 + 50 | 3 | 5 | 0.15 | 0.001> | 0.001> | 0.001> | 0.001> | 0.02 | 0.001> |
| 13 | | 5 + 15 | 0 | 0.2 | 0 | 0.001> | 0.001> | 0.001> | 0.001> | 0.001> | 0.001> |
| 14 | | 5 + 95 | 0 | 0.2 | 0 | 0.001> | 0.001> | 0.001> | 0.001> | 0.001> | 0.001> |
| 15 | Epoxy- | 5 + 20 | 3 | 5 | 0.15 | 0.001> | 0.001> | 0.001> | 0.001> | 0.02 | 0.001> |
| 16 | polyester | 5 + 95 | 3 | 5 | 0.15 | 0.001> | 0.001> | 0.001> | 0.001> | 0.02 | 0.001> |
| 17 | paint | 5 + 5 | 3 | 5 | 0.15 | 0.001> | 0.001> | 0.001> | 0.001> | 0.02 | 0.001> |

TABLE 17-continued

| No. | Painting type | Thickness (μm) | Mg | Al | Si | Ca | Be | Ti | Cu | Ni | Co |
|---|---|---|---|---|---|---|---|---|---|---|---|
| 18 | Melamine- | 5 + 10 | 3 | 5 | 0.15 | 0.001> | 0.001> | 0.001> | 0.001> | 0.02 | 0.001> |
| 19 | polyester | 5 + 50 | 3 | 5 | 0.15 | 0.001> | 0.001> | 0.001> | 0.001> | 0.02 | 0.001> |
| 20 | paint | 5 + 15 | 0 | 0.2 | 0 | 0.001> | 0.001> | 0.001> | 0.001> | 0.001> | 0.001> |
| 21 | Epoxy- | 5 + 20 | 3 | 5 | 0.15 | 0.001> | 0.001> | 0.001> | 0.001> | 0.02 | 0.001> |
| 22 | polyester | 5 + 95 | 3 | 5 | 0.15 | 0.001> | 0.001> | 0.001> | 0.001> | 0.02 | 0.001> |
| 23 | paint + | 5 + 5 | 3 | 5 | 0.15 | 0.001> | 0.001> | 0.001> | 0.001> | 0.02 | 0.001> |
| 24 | Urethane- | 5 + 10 | 3 | 5 | 0.15 | 0.001> | 0.001> | 0.001> | 0.001> | 0.02 | 0.001> |
| 25 | polyester | 5 + 50 | 3 | 5 | 0.15 | 0.001> | 0.001> | 0.001> | 0.001> | 0.02 | 0.001> |
| 26 | paint | 5 + 15 | 0 | 0.2 | 0 | 0.001> | 0.001> | 0.001> | 0.001> | 0.001> | 0.001> |
| 27 | Epoxy- | 5 + 20 | 3 | 5 | 0.15 | 0.001> | 0.001> | 0.001> | 0.001> | 0.02 | 0.001> |
| 28 | polyester | 5 + 95 | 3 | 5 | 0.15 | 0.001> | 0.001> | 0.001> | 0.001> | 0.02 | 0.001> |
| 29 | paint + | 5 + 5 | 3 | 5 | 0.15 | 0.001> | 0.001> | 0.001> | 0.001> | 0.02 | 0.001> |
| 30 | Acrylic | 5 + 10 | 3 | 5 | 0.15 | 0.001> | 0.001> | 0.001> | 0.001> | 0.02 | 0.001> |
| 31 | paint | 5 + 15 | 3 | 5 | 0.15 | 0.001> | 0.001> | 0.001> | 0.001> | 0.001> | 0.001> |
| 32 | | " | 0 | 0.2 | 0 | 0.001> | 0.001> | 0.001> | 0.001> | 0.001> | 0.001> |
| 33 | Polyester | 5 | 3 | 5 | 0.15 | 0.001> | 0.001> | 0.001> | 0.001> | 0.02 | 0.001> |
| 34 | paint | 10 | 3 | 5 | 0.15 | 0.001> | 0.001> | 0.001> | 0.001> | 0.02 | 0.001> |
| 35 | | 20 | 3 | 5 | 0.15 | 0.001> | 0.001> | 0.001> | 0.001> | 0.02 | 0.001> |

| | Composition of hot-dip Zn—Mg—Al—Si alloy coating layer (wt %) | | | | | Peeling width | |
|---|---|---|---|---|---|---|---|
| No. | Cr | Mn | Fe | Pb | Sb | (mm) | Remark |
| 1 | 0.001> | 0.001> | 0.03 | 0.05 | 0.001> | 4 | Invention |
| 2 | 0.001> | 0.001> | 0.03 | 0.05 | 0.001> | 4 | Example |
| 3 | 0.001> | 0.001> | 0.03 | 0.05 | 0.001> | 4 | |
| 4 | 0.001> | 0.001> | 0.03 | 0.05 | 0.001> | 4 | |
| 5 | 0.001> | 0.001> | 0.03 | 0.05 | 0.001> | 4 | |
| 6 | 0.001> | 0.001> | 0.03 | 0.05 | 0.001> | 4 | |
| 7 | 0.03 | 0.001> | 0.03 | 0.05 | 0.001> | 4 | |
| 8 | 0.001> | 0.03 | 0.03 | 0.05 | 0.001> | 4 | |
| 9 | 0.001> | 0.001> | 0.03 | 0.05 | 0.001> | 3 | |
| 10 | 0.001> | 0.001> | 0.03 | 0.05 | 0.001> | 4 | |
| 11 | 0.001> | 0.001> | 0.03 | 0.05 | 0.001> | 4 | |
| 12 | 0.001> | 0.001> | 0.03 | 0.05 | 0.001> | 4 | |
| 13 | 0.001> | 0.001> | 0.03 | 0.05 | 0.001> | 10 | Comparative |
| 14 | 0.001> | 0.001> | 0.03 | 0.05 | 0.001> | 10 | Example |
| 15 | 0.001> | 0.001> | 0.03 | 0.05 | 0.001> | 4 | Invention |
| 16 | 0.001> | 0.001> | 0.03 | 0.05 | 0.001> | 3 | Example |
| 17 | 0.001> | 0.001> | 0.03 | 0.05 | 0.001> | 4 | |
| 18 | 0.001> | 0.001> | 0.03 | 0.05 | 0.001> | 4 | |
| 19 | 0.001> | 0.001> | 0.03 | 0.05 | 0.001> | 4 | |
| 20 | 0.001> | 0.001> | 0.03 | 0.05 | 0.001> | 10 | Comparative Example |
| 21 | 0.001> | 0.001> | 0.03 | 0.05 | 0.001> | 4 | Invention |
| 22 | 0.001> | 0.001> | 0.03 | 0.05 | 0.001> | 3 | Example |
| 23 | 0.001> | 0.001> | 0.03 | 0.05 | 0.001> | 4 | |
| 24 | 0.001> | 0.001> | 0.03 | 0.05 | 0.001> | 4 | |
| 25 | 0.001> | 0.001> | 0.03 | 0.05 | 0.001> | 4 | |
| 26 | 0.001> | 0.001> | 0.03 | 0.05 | 0.001> | 10 | Comparative Example |
| 27 | 0.001> | 0.03 | 0.03 | 0.05 | 0.001> | 4 | Invention |
| 28 | 0.001> | 0.001> | 0.03 | 0.05 | 0.001> | 3 | Example |
| 29 | 0.001> | 0.001> | 0.03 | 0.05 | 0.001> | 4 | |
| 30 | 0.001> | 0.001> | 0.03 | 0.05 | 0.001> | 4 | |
| 31 | 0.001> | 0.001> | 0.03 | 0.05 | 0.001> | 8 | Comparative |
| 32 | 0.001> | 0.001> | 0.03 | 0.05 | 0.001> | 10 | Example |
| 33 | 0.001> | 0.001> | 0.03 | 0.05 | 0.001> | 4 | |
| 34 | 0.001> | 0.001> | 0.03 | 0.05 | 0.001> | 3 | Invention |
| 35 | 0.001> | 0.001> | 0.03 | 0.05 | 0.001> | 4 | Example |

TABLE 18

| | Painting | Thickness | Composition of hot-dip Zn—Mg—Al—Si alloy coating layer (wt %) | | | | | | | | |
|---|---|---|---|---|---|---|---|---|---|---|---|
| No. | type | (μm) | Mg | Al | Si | Ca | Be | Ti | Cu | Ni | Co |
| 36 | Polyester | 50 | 3 | 5 | 0.15 | 0.001> | 0.001> | 0.001> | 0.001> | 0.02 | 0.001> |
| 37 | paint | 100 | 3 | 5 | 0.15 | 0.001> | 0.001> | 0.001> | 0.001> | 0.02 | 0.001> |
| 38 | | 20 | 0 | 0.2 | 0 | 0.001> | 0.001> | 0.001> | 0.001> | 0.001> | 0.001> |
| 39 | Epoxy- | 5 | 3 | 5 | 0.15 | 0.001> | 0.001> | 0.001> | 0.001> | 0.02 | 0.001> |
| 40 | polyester | 10 | 3 | 5 | 0.15 | 0.001> | 0.001> | 0.001> | 0.001> | 0.02 | 0.001> |
| 41 | paint | 20 | 3 | 5 | 0.15 | 0.001> | 0.001> | 0.001> | 0.001> | 0.02 | 0.001> |
| 42 | | 50 | 3 | 5 | 0.15 | 0.001> | 0.001> | 0.001> | 0.001> | 0.02 | 0.001> |
| 43 | | 100 | 3 | 5 | 0.15 | 0.001> | 0.001> | 0.001> | 0.001> | 0.02 | 0.001> |

TABLE 18-continued

| | | | | | | | | | | | |
|---|---|---|---|---|---|---|---|---|---|---|---|
| 44 | | 20 | 0 | 0.2 | 0 | 0.001> | 0.001> | 0.001> | 0.001> | 0.001> | 0.001> |
| 45 | Melanine- | 5 | 3 | 5 | 0.15 | 0.001> | 0.001> | 0.001> | 0.001> | 0.02 | 0.001> |
| 46 | Polyester | 10 | 3 | 5 | 0.15 | 0.001> | 0.001> | 0.001> | 0.001> | 0.02 | 0.001> |
| 47 | paint | 20 | 3 | 5 | 0.15 | 0.001> | 0.001> | 0.001> | 0.001> | 0.02 | 0.001> |
| 48 | | 50 | 3 | 5 | 0.15 | 0.001> | 0.001> | 0.001> | 0.001> | 0.02 | 0.001> |
| 49 | | 100 | 3 | 5 | 0.15 | 0.001> | 0.001> | 0.001> | 0.001> | 0.02 | 0.001> |
| 50 | | 20 | 0 | 0.2 | 0 | 0.001> | 0.001> | 0.001> | 0.001> | 0.001> | 0.001> |
| 51 | Urethane- | 5 | 3 | 5 | 0.15 | 0.001> | 0.001> | 0.001> | 0.001> | 0.02 | 0.001> |
| 52 | polyester | 10 | 3 | 5 | 0.15 | 0.001> | 0.001> | 0.001> | 0.001> | 0.02 | 0.001> |
| 53 | paint | 20 | 3 | 5 | 0.15 | 0.001> | 0.001> | 0.001> | 0.001> | 0.02 | 0.001> |
| 54 | | 50 | 3 | 5 | 0.15 | 0.001> | 0.001> | 0.001> | 0.001> | 0.02 | 0.001> |
| 55 | | 100 | 3 | 5 | 0.15 | 0.001> | 0.001> | 0.001> | 0.001> | 0.02 | 0.001> |
| 56 | | 20 | 0 | 0.2 | 0 | 0.001> | 0.001> | 0.001> | 0.001> | 0.001> | 0.001> |
| 57 | Acrylic | 5 | 3 | 5 | 0.15 | 0.001> | 0.001> | 0.001> | 0.001> | 0.02 | 0.001> |
| 58 | paint | 10 | 3 | 5 | 0.15 | 0.001> | 0.001> | 0.001> | 0.001> | 0.02 | 0.001> |
| 59 | | 20 | 3 | 5 | 0.15 | 0.001> | 0.001> | 0.001> | 0.001> | 0.02 | 0.001> |
| 60 | | 50 | 3 | 5 | 0.15 | 0.001> | 0.001> | 0.001> | 0.001> | 0.02 | 0.001> |
| 61 | | 100 | 3 | 5 | 0.15 | 0.001> | 0.001> | 0.001> | 0.001> | 0.02 | 0.001> |
| 62 | | 20 | 0 | 0.2 | 0 | 0.001> | 0.001> | 0.001> | 0.001> | 0.001> | 0.001> |

| | Composition of hot-dip Zn—Mg—Al—Si alloy coating layer (wt %) | | | | | Peeling width | |
|---|---|---|---|---|---|---|---|
| No. | Cr | Mn | Fe | Pb | Sb | (mm) | Remark |
| 36 | 0.001> | 0.001> | 0.03 | 0.05 | 0.001> | 4 | Invention |
| 37 | 0.001> | 0.001> | 0.03 | 0.05 | 0.001> | 4 | Example |
| 38 | 0.001> | 0.001> | 0.05 | 0.05 | 0.001> | 10 | Comparative Example |
| 39 | 0.001> | 0.001> | 0.03 | 0.05 | 0.001> | 4 | Invention |
| 40 | 0.001> | 0.001> | 0.03 | 0.05 | 0.001> | 3 | Example |
| 41 | 0.001> | 0.001> | 0.03 | 0.05 | 0.001> | 4 | |
| 42 | 0.001> | 0.001> | 0.03 | 0.05 | 0.001> | 4 | |
| 43 | 0.001> | 0.001> | 0.03 | 0.05 | 0.001> | 4 | |
| 44 | 0.001> | 0.001> | 0.05 | 0.05 | 0.001> | 10 | Comparative Example |
| 45 | 0.001> | 0.001> | 0.03 | 0.05 | 0.001> | 4 | Invention |
| 46 | 0.001> | 0.001> | 0.03 | 0.05 | 0.001> | 3 | Example |
| 47 | 0.001> | 0.001> | 0.03 | 0.05 | 0.001> | 4 | |
| 48 | 0.001> | 0.001> | 0.03 | 0.05 | 0.001> | 4 | |
| 49 | 0.001> | 0.001> | 0.03 | 0.05 | 0.001> | 4 | |
| 50 | 0.001> | 0.001> | 0.05 | 0.05 | 0.001> | 10 | Comparative Example |
| 51 | 0.001> | 0.001> | 0.03 | 0.05 | 0.001> | 4 | Invention |
| 52 | 0.001> | 0.001> | 0.03 | 0.05 | 0.001> | 3 | Example |
| 53 | 0.001> | 0.001> | 0.03 | 0.05 | 0.001> | 4 | |
| 54 | 0.001> | 0.001> | 0.03 | 0.05 | 0.001> | 4 | |
| 55 | 0.001> | 0.001> | 0.05 | 0.05 | 0.001> | 4 | |
| 56 | 0.001> | 0.001> | 0.03 | 0.05 | 0.001> | 10 | Comparative Example |
| 57 | 0.001> | 0.001> | 0.03 | 0.05 | 0.001> | 4 | Invention |
| 58 | 0.001> | 0.001> | 0.03 | 0.05 | 0.001> | 3 | Example |
| 59 | 0.001> | 0.001> | 0.03 | 0.05 | 0.001> | 4 | |
| 60 | 0.001> | 0.001> | 0.03 | 0.05 | 0.001> | 4 | |
| 61 | 0.001> | 0.001> | 0.03 | 0.05 | 0.001> | 4 | |
| 62 | 0.001> | 0.001> | 0.05 | 0.05 | 0.001> | 10 | Comparative Example |

Example 12

Cold-rolled sheet of 0.8 mm thickness was prepared and, without Ni precoating, was subjected to hot-dip galvanizing for 3 seconds in a 450–550° C. coating bath composed of Zn—5%Mg—10%Al—0.3%Si and then adjusted to a coating having a coating weight of 135 g/m$^2$ by $N_2$ wiping. The coating layer composition of the obtained Zn coated steel sheet is shown in Tables 19.

The coated steel sheet was subjected to degreasing treatment using FC-364S, product of Nihon Parkerizing Co., Ltd., as a degreasing agent, by the steps of immersion for 10 seconds at 60° C. in a 2 wt % aqueous solution, water washing and drying. Next, a base metal treatment material containing 2.5 parts by weight of tannic acid and 30 parts by weight of silica per 100 parts by weight of acrylic olefin resin was applied and dried in a hot-air drying furnace to obtain a coating weight of 200 mg/m$^2$. The sheet temperature reached during drying was set at 150° C. "Tannin AL," product of Fuji Chemical Industry Co., Ltd., was used as tannic acid. "Snowtex N" (product of Nissan Chemical Industries, Ltd.) was used as silica.

Next, as an undercoating, P641 primer paint (polyester resin system), product of Nippon Paint Co., Ltd., whose anti-rust pigment had been modified to an anti-rust pigment indicated in Table 19 (zinc phosphite, calcium silicate, vanadic acid/phosphoric acid mixed system, molybdic acid system) was applied with a bar coater and baked in a hot-air drying furnace under condition of an ultimate sheet temperature of 220° C. to adjust the thickness to 5 μm. As an overcoating on the undercoating, FL100HQ (polyester resin system), product of Nippon Paint Co., Ltd., was applied with a bar coater, and baked in a hot-air drying furnace under condition of an ultimate sheet temperature of 220° C. to adjust the thickness to 15 μm.

Each painted steel sheet produced in the foregoing manner was subjected to 3T bend machining (180° bend machining of three stock sheets in a clamped state) and subjected to coating adherence testing and corrosion resistance testing of the machined portion.

In the coating adherence test, adhesive tape was attached to the machined portion and the adherence of coating to the adhesive tape when it was vigorously peeled off was evaluated. The rating was based on the ratio of the length of the adhered coating to the tested length, with 0% to less than 2% being rated as 5, 2% to less than 5% as 4, an adherence amount of 5% to less than 30% as 3, 30% to less than 80% as 2, and greater than 80% as 1. A rating of 4 or higher was defined as passing.

In the corrosion resistance test, 120 cycles of a cyclic corrosion test consisting of brine spraying (5%NaCl, 35° C., 2 hr)→drying (60° C., 30%RH, 4 hr)→damping (50° C., 95%RH, 2 hr) were conducted. The red rust occurrence area ratio of the machined portion was visually observed after the cyclic corrosion test. Red rust of less than 5% was rated as 5, red rust of 5% to less than 10% as 4, red rust of 10% to less than 20% as 3, 20% to less than 30% as 2, and greater than 30% as 1. A rating of 3 or higher was defined as passing.

In the overall evaluation, a painted steel sheet that achieved a passing rating for either the coating adherence or the corrosion resistance of the machined portion was passed (marked by ○ in the table).

The evaluation results are shown in Table 19. All of the present invention materials exhibited excellent coating adherence and corrosion resistance.

a hot-air drying furnace. The sheet temperature reached during drying was set at 150° C. "Tannin AL," product of Fuji Chemical Industry Co., Ltd., "BREWTAN" (product of OmniChem s.a.) and TANAL 1 (product of OmniChem s.a.) were used as tannic acid. "Snowtex N" (product of Nissan Chemical Industries, Ltd.), designated ST-N in the table, was used as silica.

Next, as an undercoating, P641 primer paint (polyester resin system; resin type indicated as polyester in the table), product of Nippon Paint Co., Ltd., P108 primer (epoxy resin system; resin type indicated as epoxy in the table), product of Nippon Paint Co., Ltd., or P304 primer (urethane resin system; resin type indicated as urethane in the table), product of Nippon Paint Co., Ltd., whose anti-rust pigment had been modified to an anti-rust pigment indicated in Table 20 (zinc phosphite, calcium silicate, vanadic acid/phosphoric acid mixed system, molybdic acid system) was applied with a bar coater and baked in a hot-air drying furnace under condition of an ultimate sheet temperature of 220° C. to adjust the thickness to 5 μm. As an overcoating on the undercoating, FL100HQ (polyester resin system), product of Nippon Paint Co., Ltd., was applied with a bar coater, and baked in a hot-air drying furnace under condition of an ultimate sheet temperature of 220° C. to adjust the thickness to 15 μm.

Each painted steel sheet produced in the foregoing manner was subjected to 3T bend machining (1800 bend machining of three stock sheets in a clamped state) and subjected to coating adherence testing and corrosion resistance testing of the machined portion.

In the coating adherence test, adhesive tape was attached to the machined portion and the adherence of coating to the adhesive tape when it was vigorously peeled off was evaluated. The rating was based on the ratio of the length of the adhered coating to the tested length, with 0% to less than 2% being rated as 5, 2% to less than 5% as 4, an adherence amount of 5% to 30% as 3, 30% to less than 80% as 2, and greater than 80% as 1. A rating of 4 or higher was defined as passing.

In the corrosion resistance test, 120 cycles of a cyclic corrosion test consisting of brine spraying (5%NaCl, 35° C., 2 hr)→drying (60° C., 30%RH, 4 hr)→damping (50° C., 95%RH, 2 hr) were conducted. The red rust occurrence area ratio of the machined portion was visually observed after the cyclic corrosion test. Red rust of less than 5% was rated as 5, red rust of 5% to less than 10% as 4, red rust of 10% to less than 20% as 3, 20% to less than 30% as 2, and greater than 30% as 1. A rating of 3 or higher was defined as passing.

TABLE 19

| Ni precoating | Composition of hot-dip galvanizing layer (wt %) | | | Anti-rust pigment of | Fabricated portion coating | Fabricated portion corrosion | Overall | |
|---|---|---|---|---|---|---|---|---|
| ($g/m^2$) | Mg | Al | Si | undercoating | adherence | resistance | evaluation | Remark |
| None | 5 | 10 | 0.3 | Zinc phosphite | 4 | 4 | ○ | Invention Example |
| " | " | " | " | Calcium silicate | 4 | 4 | ○ | " |
| " | " | " | " | Vanadic acid/phosphoric acid (V/P pigment) | 4 | 4 | ○ | " |
| " | " | " | " | Molybdic acid system | 4 | 4 | ○ | " |

Example 13

Cold-rolled sheet of 0.8 mm thickness was prepared and subjected to hot-dip galvanizing for 3 seconds in a 450° C. coating bath composed of Zn—3%Mg—11%Al—0.2%Si system and then adjusted to a coating having a coating weight of 135 $g/m^2$ by $N_2$ wiping. The coating layer composition of the obtained Zn coated steel sheet comprised 3% of Mg, 5% of Al and 0.15% of Si.

The coated steel sheet was subjected to degreasing treatment using FC-364S, product of Nihon Parkerizing Co., Ltd., as degreasing agent, by the steps of immersion for 10 seconds at 60° C. in a 2 wt % aqueous solution, water washing and drying. Next, a base metal treatment material of the composition shown in Table 20 was applied and dried in In the overall evaluation, a painted steel sheet that achieved a passing rating for either the coating adherence or the corrosion resistance of the machined portion was passed (marked by ○ in the Table).

The evaluation results are shown in Table 20. The coated steel sheet produced under the conditions of the present invention all had coating adherence and fabricated portion corrosion resistance of a level near that of conventional chromate-treated steel sheet. Although the corrosion resistance was somewhat poorer in the case of not providing an overcoating on the base metal treatment film layer, the level thereof was not a problem. Too small a tannin content in the base metal treatment film layer was unsuitable because the adherence and the machined portion corrosion resistance were inferior. Too large a tannic acid content in the base metal treatment film layer was also unsuitable because the corrosion resistance was degraded by large cracking of the coating at the time of machining.

TABLE 20

| Base metal treatment layer | | | | | | | Undercoating | | | Overcoating | | | | | |
|---|---|---|---|---|---|---|---|---|---|---|---|---|---|---|---|
| Aqueous resin | Content/ Parts by weight | Tannic acid | Content | Silica | Content/ Parts by weight | Coating weight/ $mg \cdot m^{-2}$ | Resin type | Anti-rust pigment | Thickness/ $\mu m$ | Resin type | Thickness/ $\mu m$ | Fabricated portion coating adherence | Fabricated portion corrosion resistance | Overall evaluation | Remark |
| Acrylic olefin | 100 | Tannic acid AL | 2.5 | ST-N | 30 | 200 | Polyester | Calcium silicate | 5 | Polyester | 15 | 5 | 4 | ○ | Invention Example |

Example 14

Cold-rolled sheet of 0.8 mm thickness was prepared and subjected to hot-dip galvanizing for 3 seconds in a 450° C. coating bath composed of Zn—3%Mg—11%Al—0.2%Si system and then adjusted to a coating having a coating weight of 135 g/m$^2$ by $N_2$ wiping. A Ni precoating layer was imparted as an underlying layer. The coating layer composition of the obtained Zn coated steel sheet comprised 3% of Mg, 5% of Al and 0.15% of Si.

The coated steel sheet was subjected to degreasing treatment using FC-364S, product of Nihon Parkerizing Co., Ltd., as degreasing agent, by the steps of immersion for 10 seconds at 60° C. in a 2 wt % aqueous solution, water washing and drying. Next, a base metal treatment material of the composition shown in Table 21 was applied and dried in a hot-air drying furnace. The sheet temperature reached during drying was set at 150° C. "Tannin AL," product of Fuji Chemical Industry Co., Ltd., "BREWTAN" (product of OmniChem s.a.) and TANAL 1 (product of OmniChem s.a.) were used as tannic acid. "Snowtex N" (product of Nissan Chemical Industries, Ltd.), designated ST-N in the table, was used as silica.

Next, as an undercoating, P641 primer paint (polyester resin system; resin type indicated as polyester in the table), product of Nippon Paint Co., Ltd., P108 primer (epoxy resin system; resin type indicated as epoxy in the table), product of Nippon Paint Co., Ltd., or P304 primer (urethane resin system; resin type indicated as urethane in the table), product of Nippon Paint Co., Ltd., whose anti-rust pigment had been modified to an anti-rust pigment indicated in Table 21 (zinc phosphite, calcium silicate, vanadic acid/phosphoric acid mixed system, molybdic acid system) was applied with a bar coater and baked in a hot-air drying furnace under condition of an ultimate sheet temperature of 220° C. to adjust the thickness to 5 $\mu$m. As an overcoating on the undercoating, FL100HQ (polyester resin system), product of Nippon Paint Co., Ltd., was applied with a bar coater, and baked in a hot-air drying furnace under condition of an ultimate sheet temperature of 220° C. to adjust the thickness to 15 $\mu$M.

Each painted steel sheet produced in the foregoing manner was subjected to 3T bend machining (180° bend machining of three stock sheets in a clamped state) and subjected to coating adherence testing and corrosion resistance testing of the machined portion.

In the coating adherence test, adhesive tape was attached to the machined portion and the adherence of coating to the adhesive tape when it was vigorously peeled off was evaluated. The rating was based on the ratio of the length of the adhered coating to the tested length, with 0% to less than 2% being rated as 5, 2% to less than 5% as 4, an adherence amount of 5% to less than 30% as 3, 30% to less than 80% as 2, and greater than 80% as 1. A rating of 4 or higher was defined as passing.

In the corrosion resistance test, 120 cycles of a cyclic corrosion test consisting of brine spraying (5%NaCl, 35° C., 2 hr)→drying (60° C., 30%RH, 4 hr)→damping (50° C., 95%RH, 2 hr) were conducted. The red rust occurrence area ratio of the machined portion was visually observed after the cyclic corrosion test. Red rust of less than 5% was rated as 5, red rust of 5% to less than 10% as 4, red rust of 10% to less than 20% as 3, 20% to less than 30% as 2, and greater than 30% as 1. A rating of 3 or higher was defined as passing.

In the overall evaluation, a painted steel sheet that achieved a passing rating for either the coating adherence or the corrosion resistance of the fabricated portion was passed (marked by ○ in the Table).

The evaluation results are shown in Table 21 and can be said to be substantially the same as the results in Table 20.

TABLE 21

| Base metal treatment layer | | | | | | | Undercoating | | | Overcoating | | Fabricated portion coating adherence | Fabricated portion corrosion resistance | Overall evaluation | Remark |
|---|---|---|---|---|---|---|---|---|---|---|---|---|---|---|---|
| Aqueous resin | Content/ Parts by weight | Tannic acid | Content | Silica | Content/ Parts by weight | Coating weight/ $mg \cdot m^{-2}$ | Resin type | Anti-rust pigment | Thickness/ μm | Resin type | Thickness/ μm | | | | |
| Acrylic olefin | 100 | Tannic acid AL | 2.5 | ST-N | 30 | 200 | Polyester | Vanadic acid/ phosphoric acid (V/P pigment) | 5 | Polyester | 15 | 5 | 5 | ○ | Invention Example |

Example 15

Cold-rolled sheets of 0.8 mm thickness were prepared and subjected to hot-dip galvanizing for 3 seconds in 450–550° C. Zn—Mg—Al—Si coating baths, differing in the amounts of Mg, Al and Si, and then adjusted to a coating having a coating weight of 135 g/m$^2$ by $N_2$ wiping. The coating layer compositions of the obtained Zn coated steel sheets are shown in Table 22 and Table 23. Some of the samples were provided with Ni precoating layers as underlying layers.

Each coated steel sheet was subjected to degreasing treatment using FC-364S, product of Nihon Parkerizing Co., Ltd., as degreasing agent, by the steps of immersion for 10 seconds at 60° C. in a 2 wt % aqueous solution, water washing and drying. Next, a base metal treatment material containing 10 parts by weight of silane coupling agent, 30 parts by weight of silica and 10 parts by weight of etching fluoride per 100 parts by weight of acrylic olefin resin was applied and dried in a hot-air drying furnace to obtain a coating weight of 200 mg/m$^2$. The sheet temperature reached during drying was set at 150° C. γ-(2-Aminoethyl) aminopropyltrimethoxy silane was used as silane coupling agent, "Snowtex N" (product of Nissan Chemical Industries, Ltd.) as silica, and zinc hexafluorosilicate hexahydrate as etching fluoride.

Next, as an undercoating, P641 primer paint (polyester resin system), product of Nippon Paint Co., Ltd., whose anti-rust pigment had been modified to an anti-rust pigment indicated in Table 22 or Table 23 (zinc phosphite, calcium silicate, vanadic acid/phosphoric acid mixed system, molybdic acid system) was applied with a bar coater and baked in a hot-air drying furnace under condition of an ultimate sheet temperature of 220° C. to adjust the thickness to 5 μm. As an overcoating on the undercoating, FL100HQ (polyester resin system), product of Nippon Paint Co., Ltd., was applied with a bar coater, and baked in a hot-air drying furnace under condition of an ultimate sheet temperature of 220° C. to adjust the thickness to 15 μm.

Each painted steel sheet produced in the foregoing manner was subjected to 3T bend machining (180° bend machining of three stock sheets in a clamped state) and subjected to 120 cycles of a cyclic corrosion test consisting of brine spraying (5%NaCl, 35° C., 2 hr)→drying (60° C., 30%RH, 4 hr)→damping (50° C., 95%RH, 2 hr). The red rust occurrence area ratio of the machined portion was visually observed after the cyclic corrosion test. Red rust of less than 5% was rated as 5, red rust of 5% to less than 10% as 4, red rust of 10% to less than 20% as 3, 20% to less than 30% as 2, and greater than 30% as 1. A rating of 3 or higher was defined as passing.

The evaluation results are shown in Table 22 and Table 23. All of the present invention materials exhibited excellent corrosion resistance.

From Table 22 and Table 23 it can be seen that the painted steel sheet formed with the present invention Zn—Mg—Al—Si alloy coating layer containing a prescribed amount of Si together with Mg and Al were excellent in corrosion resistance of the fabricated portion. Regarding the comparative examples, on the other hand, the corrosion resistance was low in the case of the Zn-alloy coating layer that was low in Mg and Al content and contained no Si (No. 16), and the corrosion resistance was insufficient in all cases, even if Mg, Al and Si were added, when the Mg content was too small (No. 17), when the Mg content was too large (No. 18), when the Al content was too small (No. 19), when the total of Mg and Al content was too large (No. 20) and when the Si content was too large No. 20.

TABLE 22

| No. | Ni precoating (g/m$^2$) | Composition of hot-dip galvanizing layer (wt %) Mg | Al | Si | Anti-rust pigment of undercoating | Fabricated portion corrosion resistance | Overall evaluation | Remark |
|---|---|---|---|---|---|---|---|---|
| 1 | None | 1 | 2 | 0.06 | Zinc phosphite | 3 | ○ | Invention Example |

TABLE 22-continued

| No. | Ni precoating ($g/m^2$) | Composition of hot-dip galvanizing layer (wt %) Mg | Al | Si | Anti-rust pigment of under-coating | Fabricated portion corrosion resistance | Overall evaluation | Remark |
|---|---|---|---|---|---|---|---|---|
| 2 | None | 1 | 19 | 0.6 | Zinc phosphite | 3 | ○ | " |
| 3 | None | 3 | 5 | 0.15 | Zinc phosphite | 4 | ○ | " |
| 4 | None | 4 | 8 | 0.25 | Zinc phosphite | 4 | ○ | " |
| 5 | None | 5 | 10 | 0.3 | Zinc phosphite | 4 | ○ | " |
| 6 | None | 5 | 15 | 0.45 | Zinc phosphite | 4 | ○ | " |
| 7 | None | 5 | 15 | 1.5 | Zinc phosphite | 4 | ○ | " |
| 8 | None | 6 | 2 | 0.06 | Zinc phosphite | 4 | ○ | " |
| 9 | None | 6 | 4 | 0.12 | Zinc phosphite | 4 | ○ | " |
| 10 | None | 10 | 2 | 0.06 | Zinc phosphite | 4 | ○ | " |
| 11 | None | 10 | 10 | 0.3 | Zinc phosphite | 4 | ○ | " |
| 12 | 0.5 | 3 | 5 | 0.15 | Zinc phosphite | 5 | ○ | " |
| 13 | 0.5 | 4 | 8 | 0.25 | Zinc phosphite | 5 | ○ | " |
| 14 | 0.5 | 5 | 10 | 0.3 | Zinc phosphite | 5 | ○ | " |
| 15 | 0.5 | 6 | 4 | 0.12 | Zinc phosphite | 5 | ○ | " |
| 16 | None | 0 | 0.2 | 0 | Zinc phosphite | 1 | x | Comparative Example |
| 17 | None | 0.5 | 10 | 0.3 | Zinc phosphite | 2 | x | " |
| 18 | None | 5 | 1 | 0.03 | Zinc phosphite | 2 | x | " |
| 19 | None | 12 | 8 | 0.24 | Zinc phosphite | 2 | x | " |
| 20 | None | 5 | 15 | 3 | Zinc phosphite | 2 | x | " |

TABLE 23

| No. | Ni precoating ($g/m^2$) | Composition of hot-dip galvanizing layer (wt %) Mg | Al | Si | Anti-rust pigment of under-coating | Fabricated portion corrosion resistance | Overall evaluation | Remark |
|---|---|---|---|---|---|---|---|---|
| 1 | None | 1 | 2 | 0.06 | Molybdic acid system | 3 | ○ | Invention Example |
| 2 | None | 1 | 19 | 0.6 | Molybdic acid system | 3 | ○ | " |
| 3 | None | 3 | 5 | 0.15 | Molybdic acid system | 4 | ○ | " |
| 4 | None | 4 | 8 | 0.25 | Molybdic acid system | 4 | ○ | " |
| 5 | None | 5 | 10 | 0.3 | Molybdic acid system | 4 | ○ | " |
| 6 | None | 5 | 15 | 0.45 | Molybdic acid system | 4 | ○ | " |
| 7 | None | 5 | 15 | 1.5 | Molybdic acid system | 4 | ○ | " |
| 8 | None | 6 | 2 | 0.06 | Molybdic acid system | 4 | ○ | " |
| 9 | None | 6 | 4 | 0.12 | Molybdic acid system | 4 | ○ | " |

TABLE 23-continued

| No. | Ni precoating (g/m²) | Composition of hot-dip galvanizing layer (wt %) Mg | Al | Si | Anti-rust pigment of undercoating | Fabricated portion corrosion resistance | Overall evaluation | Remark |
|---|---|---|---|---|---|---|---|---|
| 10 | None | 10 | 2 | 0.06 | Molybdic acid system | 4 | ○ | " |
| 11 | None | 10 | 10 | 0.3 | Molybdic acid system | 4 | ○ | " |
| 12 | 0.5 | 3 | 5 | 0.15 | Molybdic acid system | 5 | ○ | " |
| 13 | 0.5 | 4 | 8 | 0.25 | Molybdic acid system | 5 | ○ | " |
| 14 | 0.5 | 5 | 10 | 0.3 | Molybdic acid system | 5 | ○ | " |
| 15 | 0.5 | 6 | 4 | 0.12 | Molybdic acid system | 5 | ○ | " |
| 16 | None | 0 | 0.2 | 0 | Molybdic acid system | 1 | x | Comparative Example |
| 17 | None | 0.5 | 10 | 0.3 | Molybdic acid system | 2 | x | " |
| 18 | None | 5 | 1 | 0.03 | Molybdic acid system | 2 | x | " |
| 19 | None | 12 | 8 | 0.24 | Molybdic acid system | 2 | x | " |
| 20 | None | 5 | 15 | 3 | Molybdic acid system | 2 | x | " |

Example 16

Cold-rolled steel sheet of 0.8 mm thickness was prepared and subjected to hot-dip galvanizing for 3 seconds in a 450° C. Zn—3%Mg—11%Al—0.2%Si alloy coating bath and then adjusted to a coating having a coating weight of 135 $g/m^2$ by $N_2$ wiping. A Ni precoating layer was imparted as an underlying layer. The coating layer composition of the obtained Zn coated steel sheet comprised 3% of Mg, 5% of Al and 0.15% of Si.

The coated steel sheet was subjected to degreasing treatment using FC-364S, product of Nihon Parkerizing Co., Ltd., as degreasing agent, by the steps of immersion for 10 seconds at 60° C. in a 2 wt % aqueous solution, water washing and drying. Next, a base metal treatment material of the composition shown in Table 24 was applied and dried in a hot-air drying furnace. The sheet temperature reached during drying was set at 150° C. γ-(2-Aminoethyl) aminopropyltrimethoxy silane, γ-mercaptopropyltrimethoxy silane or methyltrichloro silane was used as silane coupling agent. "Snowtex N" (product of Nissan Chemical Industries, Ltd.), designated ST-N in the table, was used as silica and zinc hexafluorosilicate hexahydrate as etching fluoride.

Next, as an undercoating, P641 primer paint (polyester resin system; resin type indicated as polyester in the table), product of Nippon Paint Co., Ltd., P108 primer (epoxy resin system; resin type indicated as epoxy in the table), product of Nippon Paint Co., Ltd., or P304 primer (urethane resin system; resin type indicated as urethane in the table), product of Nippon Paint Co., Ltd., whose anti-rust pigment had been modified to the anti-rust pigment indicated in Table 24 (calcium silicate) was applied with a bar coater and baked in a hot-air drying furnace under condition of an ultimate sheet temperature of 220° C. to adjust the thickness to 5 μm. As an overcoating on the undercoating, FL100HQ (polyester resin system), product of Nippon Paint Co., Ltd., was applied with a bar coater, and baked in a hot-air drying furnace under condition of an ultimate sheet temperature of 220° C. to adjust the thickness to 15 μm.

Each painted steel sheet produced in the foregoing manner was subjected to 3T bend machining (180° bend machining of three stock sheets in a clamped state) and subjected to 120 cycles of a cyclic corrosion test consisting of brine spraying (5%NaCl, 35° C., 2 hr)→drying (60° C., 30%RH, 4 hr)→damping (50° C., 95%RH, 2 hr). The red rust occurrence area ratio of the fabricated portion was visually observed after the cyclic corrosion test. Red rust of less than 5% was rated as 5, red rust of 5% to less than 10% as 4, red rust of 10% to less than 20% as 3, 20% to less than 30% as 2, and greater than 30% as 1. A rating of 3 or higher was defined as passing.

The evaluation results are shown in Table 24. The painted steel sheets produced under the conditions of the present invention had fabricated portion corrosion resistance of a level near that of conventional chromate-treated steel sheet. Although the corrosion resistance was somewhat poorer in the case of not providing an undercoating containing anti-rust pigment on the base metal treatment film layer, the level thereof was not a problem. Too small a silane coupling agent content of the base metal treatment film layer was unsuitable because the machined portion corrosion resistance was inferior.

TABLE 24

| Aqueous resin | Base metal treatment layer: Content/ Parts by weight | Silane coupl-ing agent | Con-tent | Silica | Content/ Parts by weight | Etch-ing fluor-ide | Content/ Parts by weight | Coat-ing weight/ mg·m$^{-2}$ | Undercoating: Resin type | Undercoating: Anti-rust pigment | Undercoating: Thick-ness/ μm | Overcoating: Resin type | Overcoating: Thick-ness/ μm | Fabri-cated portion cor-rosion resist-ance | Remark |
|---|---|---|---|---|---|---|---|---|---|---|---|---|---|---|---|
| Acrylic olefin | 100 | A | 10 | ST-N | 30 | D | 10 | 200 | Poly-ester | Calcium sili-cate | 5 | Poly-ester | 15 | 4 | Inven-tion |

A: γ-(2-Aminoethyl) aminopropyltrimethoxy silane
B: γ-Mercaptopropyltrimethoxy silane
C: Methyltrichloro silane
D: Zinc hexafluorosilicate hexahydrate

Example 17

Cold-rolled sheet of 0.8 mm thickness was prepared and subjected to hot-dip galvanizing for 3 seconds in a 450° C. Zn—Mg—Al—Si alloy coating bath and then adjusted to a coating having a coating weight of 135 g/m$^2$ by $N_2$ wiping. A Ni precoating layer was imparted as an underlying layer. The coating layer composition of the obtained Zn coated steel sheet comprised 3% of Mg, 5% of Al and 0.15% of Si.

The coated steel sheet was subjected to degreasing treatment using FC-364S, product of Nihon Parkerizing Co., Ltd., as degreasing agent, by the steps of immersion for 10 seconds at 60° C. in a 2 wt % aqueous solution, water washing and drying. Next, a base metal treatment material of the composition shown in Table 25 was applied and dried in a hot-air drying furnace. The sheet temperature reached during drying was set at 150° C. γ-(2-Aminoethyl) aminopropyltrimethoxy silane, γ-mercaptopropyltrimethoxy silane or methyltrichloro silane was used as silane coupling agent. "Snowtex N" (product of Nissan Chemical Industries, Ltd.), designated ST-N in the table, was used as silica and zinc hexafluorosilicate hexahydrate as etching fluoride.

Next, as an undercoating, P641 primer paint (polyester resin system; resin type indicated as polyester in the table), product of Nippon Paint Co., Ltd., P108 primer (epoxy resin system; resin type indicated as epoxy in the table), product of Nippon Paint Co., Ltd., or P304 primer (urethane resin system; resin type indicated as urethane in the table), product of Nippon Paint Co., Ltd., whose anti-rust pigment had been modified to the anti-rust pigment indicated in Table 25 (vanadic acid/phosphoric acid mixed system) was applied with a bar coater and baked in a hot-air drying furnace under condition of an ultimate sheet temperature of 220° C. to adjust the thickness to 5 μm. As an overcoating on the undercoating, FL100HQ (polyester resin system), product of Nippon Paint Co., Ltd., was applied with a bar coater, and baked in a hot-air drying furnace under condition of an ultimate sheet temperature of 220° C. to adjust the thickness to 15 μm.

Each painted steel sheet produced in the foregoing manner was subjected to 3T bend machining (180° bend machining of three stock sheets in a clamped state) and subjected to 120 cycles of a cyclic corrosion test consisting of brine spraying (5%NaCl, 35° C., 2 hr)→drying (60° C., 30%RH, 4 hr)→damping (50° C., 95%RH, 2 hr). The red rust occurrence area ratio of the machined portion was visually observed after the cyclic corrosion test. Red rust of less than 5% was rated as 5, red rust of 5% to less than 10% as 4, red rust of 10% to less than 20% as 3, 20% to less than 30% as 2, and greater than 30% as 1. A rating of 3 or higher was defined as passing.

The evaluation results are shown in Table 25. The present invention materials exhibited excellent corrosion resistance. The results were similar to those in the case of Example 16 shown in Table 24.

TABLE 25

| Aqueous resin | Base metal treatment layer: Content/ Parts by weight | Silane coupl-ing agent | Con-tent | Silica | Content/ Parts by weight | Etch-ing fluor-ide | Content/ Parts by weight | Coat-ing weight/ mg·m$^{-2}$ | Undercoating: Resin type | Undercoating: Anti-rust pigment | Undercoating: Thick-ness/ μm | Overcoating: Resin type | Overcoating: Thick-ness/ μm | Fabri-cated portion cor-rosion resist-ance | Remark |
|---|---|---|---|---|---|---|---|---|---|---|---|---|---|---|---|
| Acrylic olefin | 100 | A | 10 | ST-N | 30 | D | 10 | 200 | Poly-ester | Vanadic acid/ phos-phoric acid (V/P | 5 | Poly-ester | 15 | 5 | Inven-tion |

TABLE 25-continued

| | Base metal treatment layer | | | | | | | | Undercoating | | | Overcoating | | Fabricated portion | |
|---|---|---|---|---|---|---|---|---|---|---|---|---|---|---|---|
| Aqueous resin | Content/ Parts by weight | Silane coupling agent | Content | Silica | Content/ Parts by weight | Etching fluoride | Content/ Parts by weight | Coating weight/ $mg \cdot m^{-2}$ | Resin type | Anti-rust pigment | Thickness/ µm | Resin type | Thickness/ µm | corrosion resistance | Remark |
| | | | | | | | | | | pigment) | | | | | |

A: γ-(2-Aminoethyl) aminopropyltrimethoxy silane
B: γ-Mercaptopropyltrimethoxy silane
C: Methyltrichloro silane
D: Zinc hexafluorosilicate hexahydrate

Example 18

Table 26 shows the sliding property and coating adherence during machining of produced coated samples. Steel sheet and wire rod subjected to reduction pretreatment were hot-dip galvanizing in the range of 460–550° C. in coating baths of differing compositions. The cooling condition (cooling rate) during solidification after hot-dip galvanizing was changed in some cases to produce Zn—Mg—Al—Si alloy coated steel sheets of various structures. The coating having a coating weight was set at 135 g/m$^2$. Samples that had been Ni-precoated by electroplating were used for some of the coated steel sheets.

For evaluation, the ratio of Mg intermetallic compound phase distribution area was determined at 10 points by inspecting state photographs and element distribution using SEM-EPMA (×1000) and the average ratio was converted to volume percentage in the plating layer. As the sliding property test, a scratching property was evaluated by the Heidon sliding test. The adherence of machined portions was evaluated by wire rod coiling test. As the corrosion resistance testing method, a sample subjected to bend machining (OT bending) was evaluated for red rust property by a corrosion cycle test combining 35° C., 0.5% NaCl, a drying step (50° C., 60%) and a damping step (49° C., 98%).

TABLE 26

| No | Type of main coating matrix | Type of Mg intermetallic compound phase | Major diameter of Mg intermetallic compound µm | Volume ratio of Mg intermetallic compound % | Scratching resistance of steel sheet surface in sliding test | Cracking and peeling resistanct during wire rod coiling | Corrosion resistance of bend-machined portion (CCT) | Remark |
|---|---|---|---|---|---|---|---|---|
| 1 | Zn—Al 11%-Mg 3% | Mg—Zn-system compound | 10 | 5 | 5 | 5 | 5 | Invention Example |
| 2 | Zn—Al 11%-Mg 3% | Mg—Sn-system compound | 2 | 45 | 5 | 5 | 5 | |
| 3 | Zn—Al 11%-Mg 3% | Mg—Si-system compound | 10 | 10 | 5 | 5 | 5 | |
| 4 | Zn—Al 17%-Mg 3% compound | Mg—Sn-system | 20 | 15 | 4 | 5 | 5 | |
| 5 | Zn—Al 17%-Mg 3% | Mg—Si-system compound | 5 | 2 | 4 | 5 | 5 | |
| 6 | Zn—Al 17%-Mg 3% | Mg—Fe-system compound | 10 | 0.2 | 5 | 5 | 4 | |
| 7 | Zn—Al 6%-Mg 5% | Mg—Ni-system compound | 3 | 5 | 4 | 4 | 5 | |
| 8 | Zn—Al 6%-Mg 5% | Mg—Si-system compound | 30 | 10 | 5 | 4 | 5 | |
| 9 | Zn—Al 6%-Mg 5% | Mg—Si-system compound | 5 | 5 | 5 | 5 | 5 | |
| 10 | Zn—Al 11%-Mg 3%-Ti | Mg—Ti-system compound | 1 | 0.1 | 5 | 5 | 5 | |
| 11 | Zn—Mg 0.5%-Al 0.2% | Mg—Zn-system compound | 2 | 0.2 | 4 | 4 | 4 | |
| 12 | Zn—Al 7%-Mg 10% | Mg—Sn-system compound | 0.8 | 0.08 | 2 | 2 | 3 | Comparative Example |
| 13 | Zn—Al 6%-Mg 5% | Mg—Sn-system compound | 20 | 52 | 2 | 2 | 2 | |
| 14 | Zn—Al 0.08%-Mg 0.2% | Mg—Fe-system compound | 10 | 5 | 2 | 2 | 1 | |

The evaluation criteria were as follows.

1. Measurement of volume ratio of Mg-system intermetallic compound in plating layer Area ratio measured in EPMA ×1000 field of plating layer cross-section converted to volume ratio.

2. Scratch resistance evaluation

[1] Heidon tester

Visual observation of degree of scratching of plated steel sheet surface after sliding of steel sphere (Rating): (Degree of scratching)

Excellent

5: Minimal scratching

4: Slight scratching

3: Medium scratching

2: Extensive scratching

Inferior

1: Extreme scratching

* Rating of 3 or higher passing.

[2] Coil peeling test

Six winds of 6-mm-diameter wire rod coiled on same diameter wire rod and inspected for cracking and peeling of plating.

(Rating): (Degree of cracking and peeling of plating)

Excellent

5: Minimal cracking

4: Medium cracking

3: Extensive cracking

2: Slight peeling

Inferior

1: Extensive peeling

* Rating of 3 or higher passing.

3. Corrosion resistance of machined portion (Rating): (Time to red-rusting of machined portion (cycles))

5: More than 20 cycles

4: 10–20 cycles

3: 5–less than 10 cycles

2: 2–less than 5 cycles

1: Less than 2 cycles

* Rating of 3 or higher passing.

The Zn coated steel sheets having the coating layer structure of the present invention were superior to the comparative example materials in scratch resistance during sliding, coating adherence at wire rod coiled portions, and corrosion resistance of machined portions. Moreover, among the present invention materials, those additionally imparted with a Ni coating layer as an underlying layer of the Zn—Mg—Al coating layer were still further enhanced in plating adherence during wire rod machining compared with the case of a single coating layer.

Industrial Applicability

As pointed out in the foregoing, the Zn coated steel material or Zn coated steel sheet according to the present invention has excellent corrosion resistance because its coating layer is a Zn-alloy coating layer comprising 1–10 wt % of Mg, 2–19 wt % of Al, 0.01–2 wt % or more of Si and the balance of Zn and unavoidable impurities or, as required, an alloy coating layer further containing one or more of 0.01–1 wt % of In, 0.01–1 wt % of Bi and 1–10 wt % of Sn. Among these, the Zn coated steel materials having a metallic structure of [primary crystal $Mg_2Si$ phase] interspersed in the coating layer matrix have even better corrosion resistance.

Moreover, the painted steel sheet of the present invention has excellent corrosion resistance because its lower coating layer is a Zn-alloy coating layer comprising 1–10 wt % of Mg, 2–19 wt % of Al, 0.01–2 wt % or more of Si and the balance of Zn and unavoidable impurities, its intermediate layer is a chromate film, and its upper layer is an organic resin layer.

Further, the painted steel sheet of the present invention is planet-friendly, since it does not contain chromium believed to put a heavy load on the environment, and has excellent machined portion corrosion resistance, because its lower coating layer is a Zn-alloy coating layer comprising 1–10 wt % of Mg, 2–19 wt % of Al, 0.01–2 wt % or more of Si and the balance of Zn and unavoidable impurities, its intermediate layer is a tannin- or tannic acid-system treatment layer or a silane coupling-system treatment layer, and its upper layer is an organic resin layer. Steel material, coated steel sheet and painted steel sheet excellent in use performance can therefore be provided at low cost.

What is claimed is:

1. A Zn coated steel material excellent in corrosion resistance characterized in having, on a surface of a steel material, a Zn-alloy coating layer containing 2–19 wt % of Al, 1–10 wt % of Mg, 0.01–2 wt % of Si and the balance of Zn and unavoidable impurities.

2. A Zn coated steel material excellent in corrosion resistance according to claim 1, characterized in that Mg and Al in the Zn-alloy coating layer satisfy the following formula: $Mg(\%)+Al(\%) \leqq 20\%$.

3. A Zn coated steel material excellent in corrosion resistance according to claim 1, characterized in that one or more of 0.01–1 wt % of In, 0.01–1 wt % of Bi and 1–10 wt % of Sn are further contained as Zn-alloy coating components.

4. A Zn coated steel material excellent in corrosion resistance according to claim 1, characterized in that one or more of 0.01–0.5% of Ca, 0.01–0.2% of Be, 0.01–0.2% of Ti, 0.1–1.0% of Cu, 0.01–1.0% of Ni, 0.01–0.3% of Co, 0.01–0.2% of Cr, 0.01–0.5% of Mn, 0.01–3.0% of Fe and 0.01–0.5% of Sr are further contained as Zn-alloy plating components, that total amount of elements other than these elements is held to not greater than 0.5 wt % and that among them Pb is limited to not greater than 0.1 wt % and Sb to not greater than 0.1 wt %.

5. A Zn coated steel material excellent in corrosion resistance according to claim 1, characterized in that the coating layer has a metallic structure of primary crystal $Mg_2Si$ phase, $MgZn_2$ phase and Zn phase interspersed in a matrix of an $Al/Zn/MgZn_2$ ternary eutectic structure.

6. A Zn coated steel material excellent in corrosion resistance according to claim 1, characterized in that the coating layer has a metallic structure of primary crystal $Mg_2Si$ phase, $MgZn_2$ phase and Al phase interspersed in a matrix of an $Al/Zn/mgZn_2$ ternary eutectic structure.

7. A Zn coated steel material excellent in corrosion resistance according to claim 1, characterized in that the coating layer has a metallic structure of primary crystal $Mg_2Si$ phase, $MgZn_2$ phase and Zn phase and Al phase interspersed in a matrix of an $Al/Zn/MgZn_2$ ternary eutectic structure.

8. A Zn coated steel material excellent in corrosion resistance according to claim 1, characterized in that the plating layer has a metallic structure of primary crystal $Mg_2Si$ phase, Zn phase and Al phase interspersed in a matrix of an $Al/Zn/MgZn_2$ ternary eutectic structure.

9. A Zn coated steel material excellent in corrosion resistance according to claim 1, characterized in that a Ni coating layer is formed as an underlying layer for the Zn-alloy coating layer.

10. A Zn coated steel material excellent in corrosion resistance and machinability according to claim 1, characterized in that a Mg-system intermetallic compound phase of a major diameter of not less than 1 $\mu$m is dispersed in the Zn-alloy coating layer at a content of 0.1–50 vol %.

11. A Zn coated steel material excellent in corrosion resistance and machinability according to claim 10, characterized in that the intermetallic compound phase containing Mg is one or more of Mg—Si-system, Mg—Zn-system, Mg—Sn-system, Mg—Fe-system, Mg—Ni-system, Mg—Al-system and Mg—Ti-system.

12. A Zn coated steel material excellent in corrosion resistance and machinability according to claim 10, characterized in that a Ni coating layer is formed at 0.2–2 g/$m^2$ as a base metal treatment for the Zn-alloy coating layer.

13. A Zn coated steel sheet excellent in corrosion resistance according to claim 1, characterized in that it has, as an upper layer on the Zn-alloy coating layer, a resin chromate film of 10–300 mg/$m^2$ as metallic chromium formed by applying and drying a resin chromate bath that utilizes a water-soluble chromium compound of a chromium reducibility $\{CR^{3+}/(CR^{3+}+Cr^{6+})\times 100(wt\ \%)\}$ of not greater than 70(wt %), is adjusted to a copresence of phosphoric acid and the water-soluble chromium compound such that a $H_3PO_4$/$CrO_3$ ratio (as chromic acid) is not less than 1 and a $H_3PO_4/Cr^{6+}$ ratio (as chromic acid) is not greater than 5, and is blended with an organic resin to make an organic resin/$CrO_3$ ratio (as chromic acid) not less than 1.

14. A painted steel sheet excellent in corrosion resistance according to claim 1, characterized in that it has a chromate film intermediate layer disposed on the Zn-alloy coating layer and an organ film upper layer of 1–100 $\mu$m thickness disposed on the chromate film intermediate layer.

15. A painted steel sheet excellent in corrosion resistance according to claim 14, characterized in that the organic film is a thermosetting resin coating film.

16. A painted steel sheet that is excellent in fabricated-portion corrosion resistance and puts little load on the environment according to claim 1, characterized in that it has, on the Zn-alloy coating layer, an intermediate layer containing resin as solids content and 0.2–50 parts by weight tannin or tannic acid per 100 parts by weight resin, and has an organic film layer as an upper layer.

17. A painted steel sheet that is excellent in fabricated-portion corrosion resistance and puts little load on the environment according to claim 1, characterized in that it has on the Zn-alloy coating layer an intermediate layer containing resin as a solids content and 0.1–3000 parts by weight of a silane coupling agent per 100 parts by weight resin, and has an organic film layer as an upper layer.

18. A painted steel sheet that is excellent in fabricated-portion corrosion resistance an the load on the environment according to claim 16, characterized in that the organic film layer has a thickness of 1–100 $\mu$m.

19. A painted steel sheet that is excellent in fabricated-portion corrosion resistance and puts little load on the environment according to claim 16, characterized in that the intermediate layer further contains 10–500 parts by weight of fine-grain silica as solid content.

20. A painted steel sheet that is excellent in fabricated-portion corrosion resistance and puts little load on the environment according to claim 17, characterized in that the intermediate layer further contains at least one of 1–2000 parts by weight of fine-grain silica and 0.1–1000 parts by weight of an etching fluoride as solid content.

21. A painted steel sheet that is excellent in fabricated-portion corrosion resistance and puts little load on the environment according to claim 16, wherein the organic film layer is composed of an undercoating containing an anti-rust pigment and a colored overcoating.

22. In a method of producing a Zn-alloy coated steel material having, on a surface of a steel material, a Zn-alloy coating containing 3–10 wt % of Mg, 4–19 wt % of Al, 0.01–2 wt % 6 of Si and the balance of Zn and unavoidable impurities, the method of producing the Zn-alloy coated steel material excellent in corrosion resistance comprising:

providing a coating bath containing said Zn-alloy;

setting said coating bath at a temperature range of not less than 450° C. and not greater than 650° C.;

coating said surface of said steel material with said Zn-alloy;

after coating, cooling at a cooling rate of not less than 0.5° C./second.

* * * * *